United States Patent [19]

Masui et al.

[11] Patent Number: 5,238,640

[45] Date of Patent: Aug. 24, 1993

[54] METHOD OF MANUFACTURING A LAMINATED BODY

[75] Inventors: Shohei Masui, Kyoto; Kanemitsu Oishi, Siga; Kiyoshi Mitsui, Chiba; Toshihiro Hosokawa; Ryuichi Ishitsubo, both of Osaka, all of Japan

[73] Assignee: Sumitomo Chemical Co., Limited, Osaka, Japan

[21] Appl. No.: 458,401

[22] Filed: Dec. 28, 1989

Related U.S. Application Data

[63] Continuation-in-part of Ser. No. 259,394, Oct. 18, 1988, abandoned, which is a continuation of Ser. No. 106,510, Oct. 9, 1987, abandoned, which is a continuation-in-part of Ser. No. 805,726, Dec. 6, 1985, abandoned.

[30] Foreign Application Priority Data

Dec. 10, 1984 [JP] Japan ................... 59-261088

[51] Int. Cl.⁵ ............... B29C 43/18; B29C 43/20
[52] U.S. Cl. .................... 264/266; 264/295; 264/296; 425/112; 425/125; 425/128; 425/DIG. 5
[58] Field of Search ............ 264/259, 295, 296, 266; 425/112, 125, 128, DIG. 5

[56] References Cited

U.S. PATENT DOCUMENTS

| 2,796,634 | 6/1957 | Chellis | 264/296 X |
| 2,797,179 | 6/1957 | Reynolds et al. | 264/296 X |
| 3,616,012 | 10/1971 | Salvarani | 264/295 X |
| 3,904,343 | 9/1975 | Scott, Jr. | 425/DIG. 5 |
| 4,470,786 | 9/1984 | Sano et al. | 425/125 |

FOREIGN PATENT DOCUMENTS

| 56-5747 | 1/1981 | Japan | 264/259 |
| 1371102 | 10/1974 | United Kingdom | 425/112 |

OTHER PUBLICATIONS

English-Language Translation of Japanese Reference (Kokai) 56-5,747 (Published Jan. 1981).

Primary Examiner—Leo B. Tentoni
Attorney, Agent, or Firm—Birch, Stewart, Kolasch & Birch

[57] ABSTRACT

A method of manufacturing a laminated body consisting of a synthetic resin member provided with a layer member thereon, in which the member is bent to cover the edges of the resin member. The method includes the compression, resulting from a male mold and a female mold approaching each other, of the layer member and molten resin. The female mold has flanges mounted on its edges to permit the layer member to cover the edges of the resin during compression. Molten resin materials are supplied between the male and female molds prior to subsequent to the compression.

32 Claims, 18 Drawing Sheets

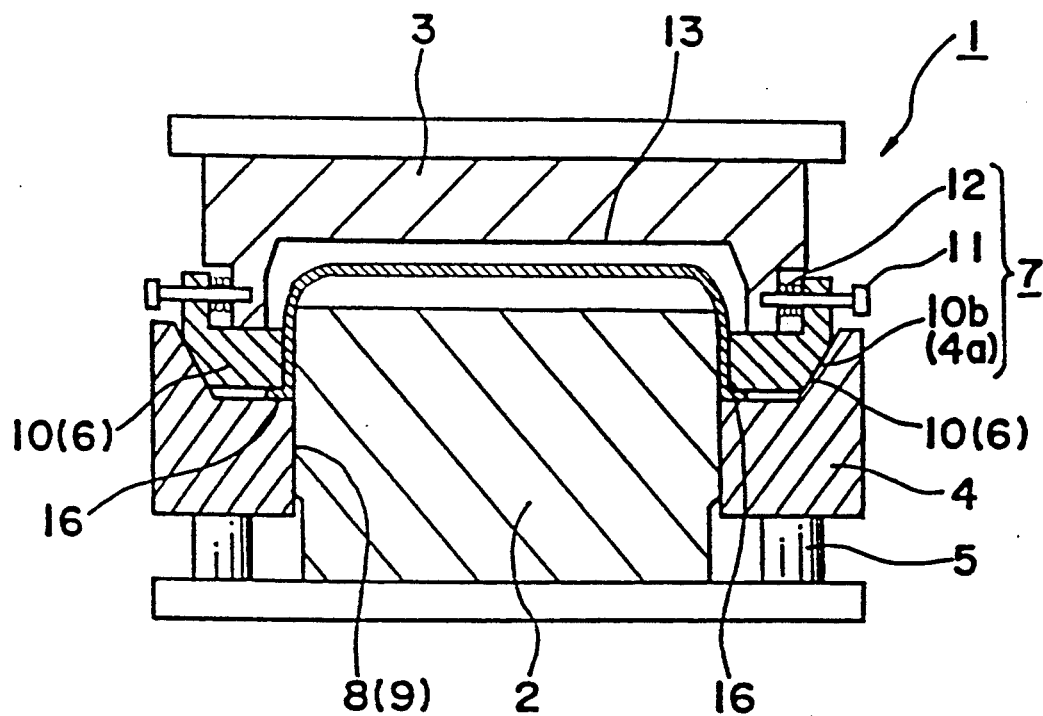

METHOD OF MANUFACTURING A LAMINATED BODY

CROSS REFERENCE TO RELATED APPLICATIONS

This application is a continuation-in-part of copending application Ser. No. 07/259,394 filed Oct. 18, 1988, now abandoned, which is a continuation-in-part of Ser. No. 07/106,510 filed Oct. 9, 1987, (now abandoned) which is a continuation-in-part of Ser. No. 808,726 filed Dec. 6, 1985, (now abandoned). The entire contents of all of the above applications are hereby incorporated by reference.

FIELD OF THE INVENTION

The present invention relates to a method for the production of laminated bodies. More particularly, the present invention relates to a method for manufacturing a laminated body by the interlocking action of a female and male mold, which causes the lamination of a synthetic resin to an outer layer.

BACKGROUND OF THE INVENTION

Synthetic resin moldings are presently useful in fields including, for example, automobiles, home electric appliances and the like. These resin moldings are inexpensive, lightweight, and can be easily shaped.

On the other hand, however, these synthetic resin moldings have disadvantages in that they are cheap-looking, cold feeling and easily scratched. Thus, it has been attempted to manufacture these moldings, such that they would have a more decorative look and have a softer feel.

Although a variety of investigations have been made with the object of developing some type of molded article characterized with the features mentioned above, it has proved difficult to produce a shapable molded article made from a single substance, which would be characterized with the desired strength and surface properties. Therefore, the products presently used are of such types of laminated bodies which are assembled with plural materials and which have a variety of functions.

There has been proposed a method of manufacturing a laminated body, for example, in Japanese Patent Application Disclosure No. 150740/1984, whereby the method of molding the laminated body is performed by the use of a molding apparatus. This apparatus is provided shiftably with a female mold or a male mold and with an upper layer member-fixing frame having a sliding part through which the male mold passes slidably. After holding an upper layer member between the upper layer member-fixing frame and the female mold, and then tightening both molds, a molten resin is supplied between the upper layer member and the female mold or the male mold and finally laminated body is completely formed or shaped.

In this specification, the mold whose outer side face corresponds to the side face of the outermost circumference opposite to each other at the mold-tightening time, is called a male mold, while the one whose inner side face corresponds to the same above-mentioned side face of the outermost circumference opposite to each other at the same mold-tightening time, is called female mold.

However, the above described method is incapable of manufacturing a laminated body characterized with a good appearance, and which is free of wrinkles or tears on the upper layer member covering the synthetic resin, as shown in FIG. 21. In attempting to obtain a laminated body, as shown in FIG. 22 having a bent part of the upper layer member, not only is the bending process of the upper layer member required separately after having made the laminated body in advance in the form as shown in FIG. 21, but also wrinkles are likely to occur at the bent part of the upper layer member.

The method according to the present invention has been achieved by solving the above-mentioned disadvantages in the prior art and thereby enabling one to obtain a laminated body which is covered with an upper layer member which has no wrinkles, tears, and other defects and which has a good appearance. Further, there are no wrinkles at the bent part of the upper layer member.

SUMMARY OF THE INVENTION

Accordingly, an object of the present invention is to provide a method for manufacturing a laminated body so as to overcome the disadvantages of the prior art.

Another object of the present invention is to develop a laminated body having no wrinkles, tears, or other defects.

These and other objects of the present invention are accomplished by providing a method of manufacturing a laminated body consisting of a synthetic resin provided with a layer member thereon.

FIG. 27(A) to FIG. 27(E) indicates the basic method of the present invention, which comprises the following continuous steps:

arranging said layer member on a slidable frame attached to the sides of a male mold and providing a female mold having flanges mounted thereon (see FIG. 27(A));

holding a periphery of said layer member by closing said female mold and said flanges against said slidable frame and said male mold and shifting said flanges to the inside of the cavity of said female mold at least at the time of said closing (see FIG. 27(B));

preforming said layer member by approaching the molds toward each other after closing (see FIG. 27(C));

supplying, at any time from said holding and prior to the forming or shaping, molten resin between said layer member and said male mold (see FIG. 27(D));

start of forming or shaping said layer member and said molten resin to cover the face of a resin body being formed or shaped from said molten resin with said layer member;

finally forming or shaping said layer member to form a bend for lapping all end portions of the formed or shaped molten resin by approaching said female mold and said flanges against said male mold and slidable frame so as to form or shape laminated body (see FIG. 27 (E)).

BRIEF DESCRIPTION OF THE DRAWINGS

The present invention will become more fully understood from the following detailed description and accompanying drawings which are illustrative only, and thus are not limitative of the present invention, and wherein:

FIGS. 1-9 illustrate an exemplary embodiment of the method and apparatus of the present invention, wherein:

FIG. 1 is a cross-sectional view of the arranging process in exemplary embodiment;

FIG. 2 is a top view from the direction of the line of A—A of FIG. 1;

FIG. 3 is a bottom view from the direction of the line of B—B of FIG. 1;

FIG. 4 is a cross-sectional view, of the start of the holding process as the female mold moves to engage the male mold;

FIG. 5 is a cross-sectional view of the holding process in the exemplary embodiment;

FIG. 6 is a upper view of FIG. 5;

FIG. 7 is a cross-sectional view of the forming or shaping process by the male and female mold approaching each other after the molten resin has been inserted;

FIG. 8 is a cross-sectional view of the final forming or shaping process of the laminated body being produced; and FIG. 9 is a cross-sectional view of the release of the female mold from the male mold;

FIGS. 10 to 16 illustrate a modified embodiment of the present invention, wherein:

FIG. 10 is a cross-sectional view thereof;

FIG. 11 is a cross-sectional view taken from the line A—A of FIG. 10;

FIG. 12 is a cross-sectional view prior to engagement of the male mold with the female mold;

FIG. 13 is a cross-sectional view of the enmgagement of the male mold with the female mold;

FIG. 14 is a cross-sectional view of the further engagement of the male mold with the female mold;

FIG. 15 is a cross-sectional view of the cutting of the upper layer member; and

FIG. 16 is a cross-sectional view of the release of the male mold from the female mold;

FIGS. 17 to 19 illustrate another embodiment of the present invention, wherein:

FIG. 17 is a cross-sectional view thereof;

FIG. 18 is a cross-sectional view as the male mold moves to engage the female mold; and FIG. 19 is a cross-sectional view of the engagement of the male mold with the female mold;

DETAILED DESCRIPTION OF THE INVENTION

Figure 1:
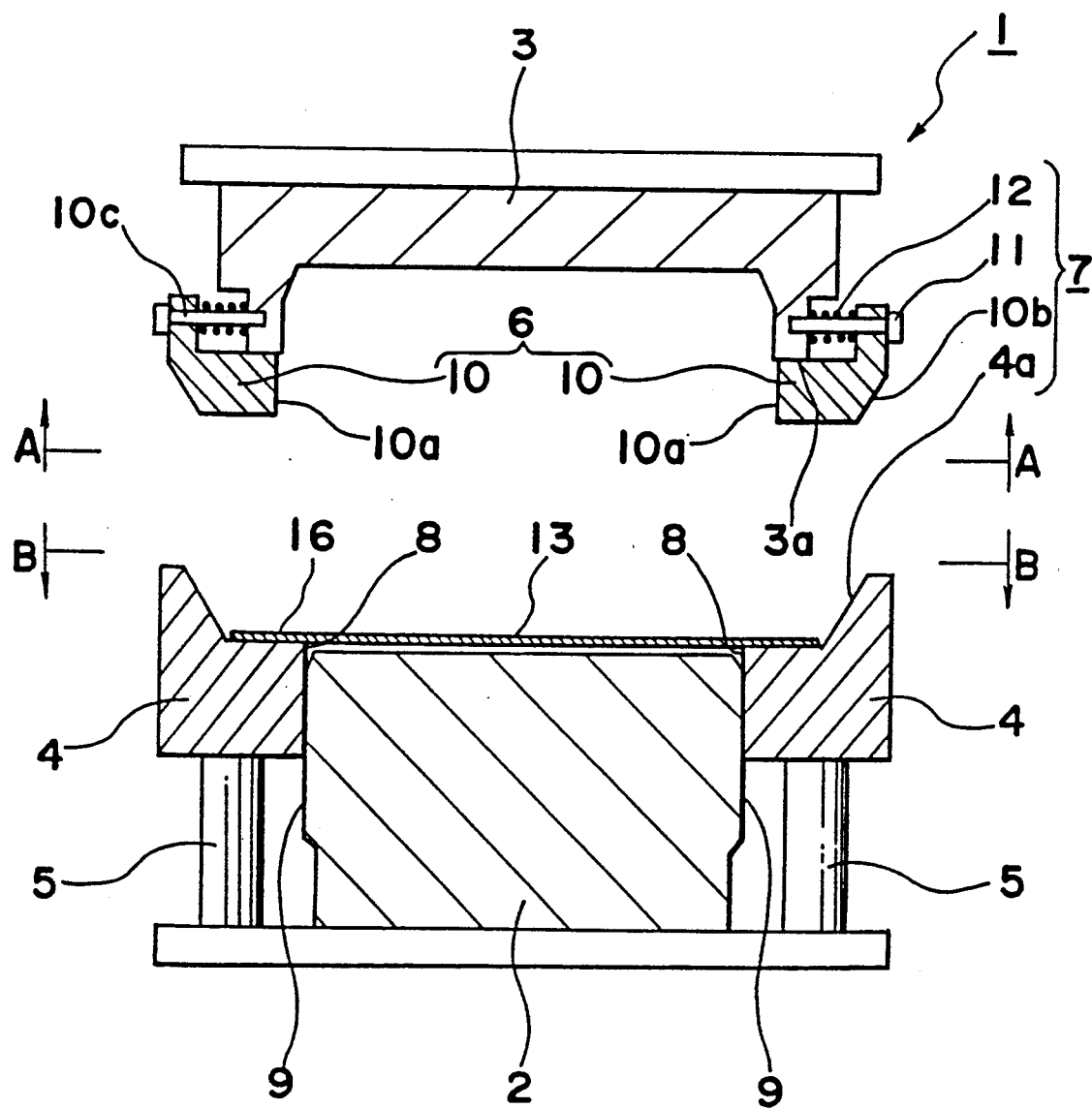
Figure 2:
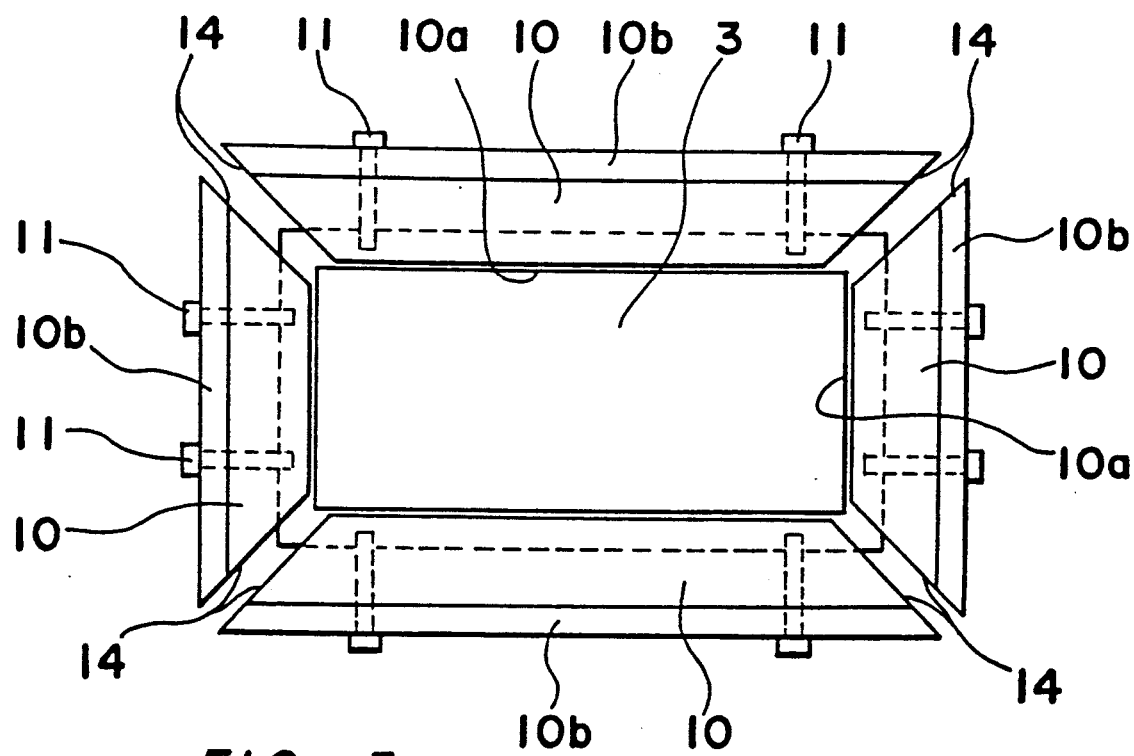
Figure 3:
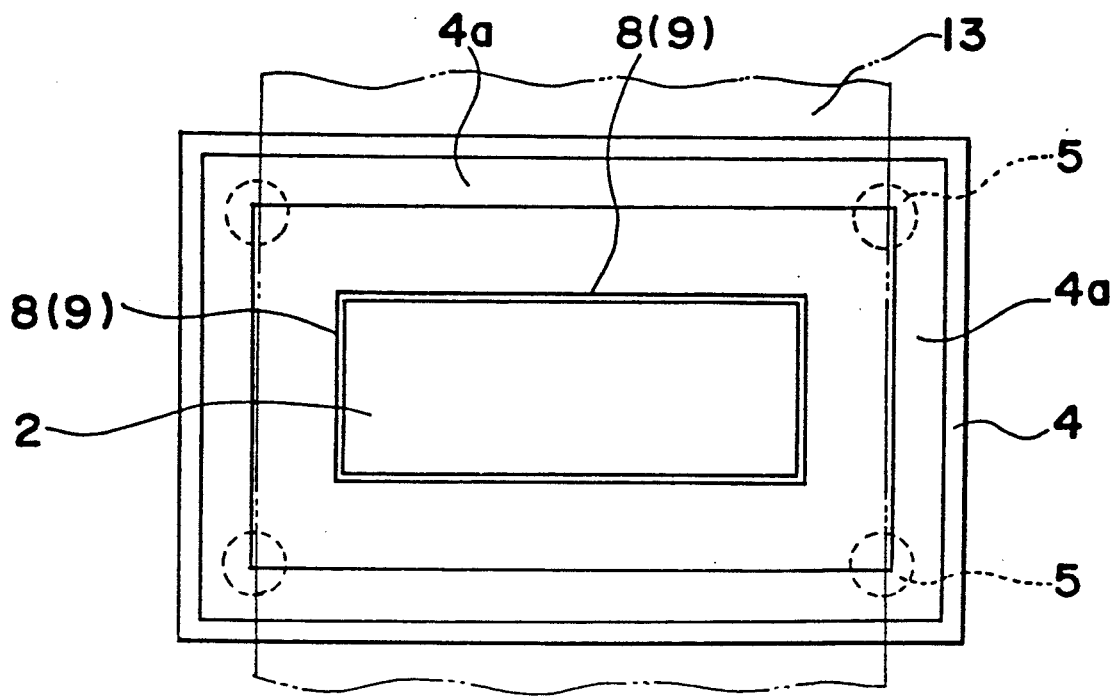
Figure 4:
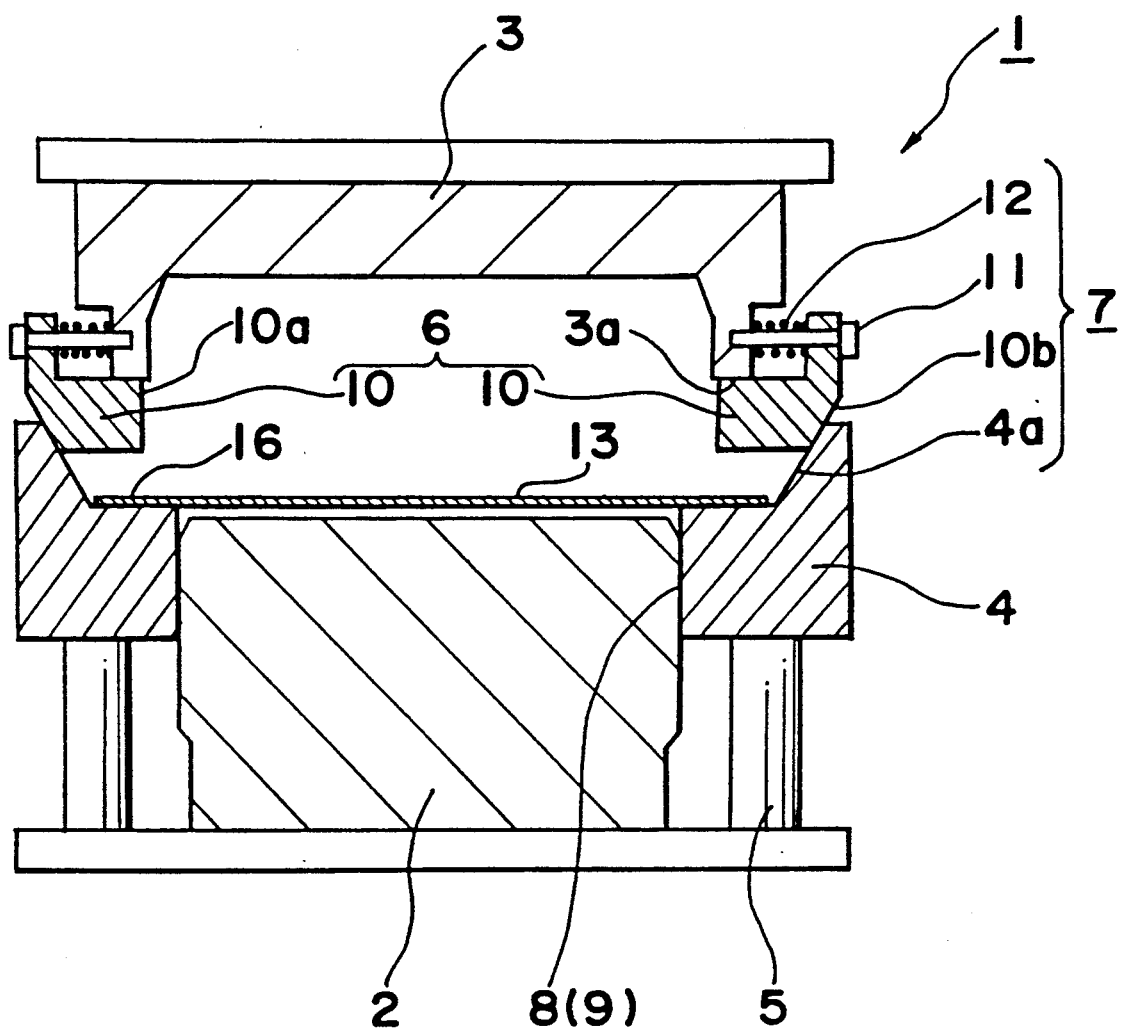
Figure 5:
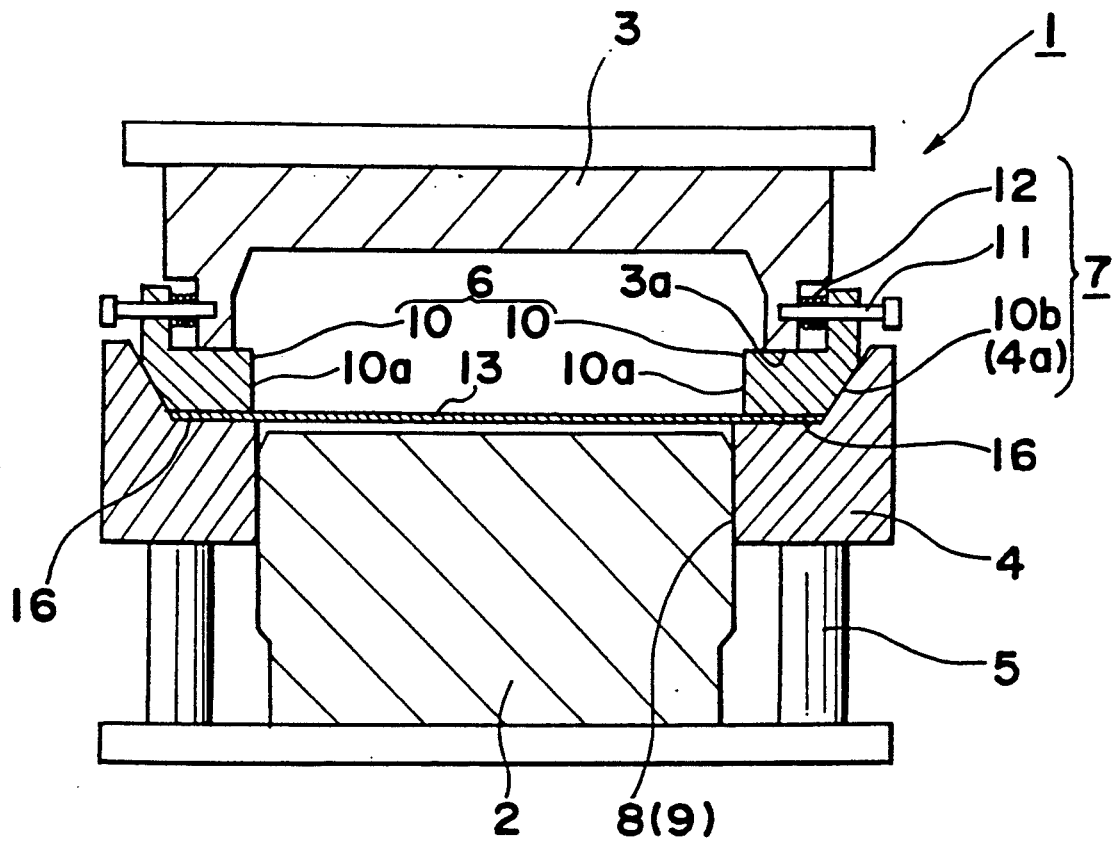
Figure 6:
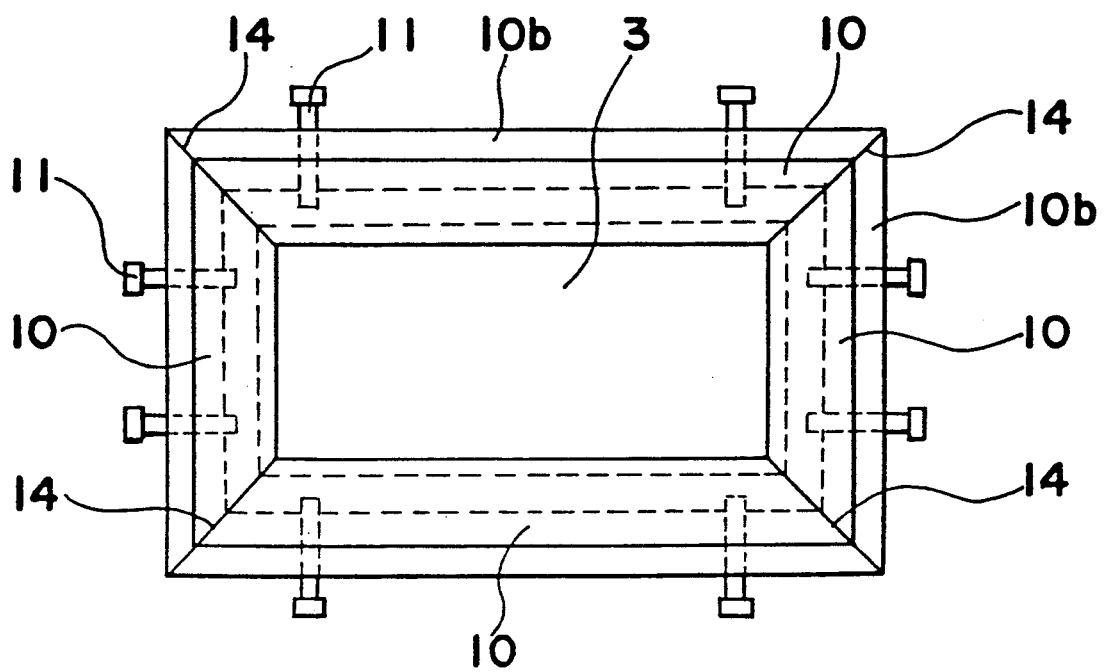

A detailed description of the first embodiment of the present invention will be made with reference to FIGS. 1-9.

In the Figures, references numerals 1-9, 13, 15, and 18 each indicate a molding apparatus, a male mold, a female mold, an upper layer member-fixing frame, an expanding and contracting means, a split frame, a shifting mechanism, a sliding face, an outer side face of male mold 2, an upper layer member, molten resin, and a laminated body, respectively.

Molding apparatus 1 comprises male mold 2, the upper layer member-fixing frame, an expanding and contracting means 5, these three situated below female mold 3 supported by a well-known vertical motion mechanism (not shown), flange 6 attached to foregoing female mold 3 and shifting mechanism 7 for permitting the above to split horizontally.

Slidable frame 4 which has its upper face opposite to split female 6 is mounted shiftably by a plurality of expanding and contracting means 5, and has its own sliding face 8 and tapered surface 4a.

It is permissible in expanding and contracting means 5 to use any known oil pressure cylinder, air pressure cylinder, air pressure spring, urethane spring, steel spring, and the like depending on the required stroke.

In this connection, there can be adopted preferably a spring mechanism expanding and contracting in response to the mold-tightening force of both molds 2 and 3.

Sliding face 8 is one wherein outer side face 9 of male mold 2 slides over the whole circumference.

Flanges 6 consists of a plurality of split parts 10, each of the split parts is attached to the side of female mold 3, and slides in a unified form (see FIG. 6) and in an expanded form (see FIG. 2) on face 3a of female mold 3 opposite to slidable frame 4, when inner face 10a of each split part 10 is situated inside the cavity of female mold 3 at the cavity of the female 3 at the expanded form.

Split part 10 has tapered face 10a of the same angle as tapered face 4a, and further has sliding holes 10c through which plural rod member 11 passes slidingly.

Above-mentioned rod members 11 are screwed to (not shown) female mold 3 to be secured fixedly thereon and are provided elastically with, for example, springs 12. (Not shown in FIG. 2.)

Shifting mechanism 7 is composed of above-mentioned tapered faces 4a and 10b, rod member 11, and springs 12.

Using molding apparatus 1, the method according to the present invention is conducted, for example, in the sequence of steps from 1 to 6 described below:

1. To start, upper layer member 13 is arranged between slidable frame 4 and flanges 6. In other words, upper layer member 13 is arranged on slidable frame 4. (See FIG. 1, the arranged process.)

2. Next, when actuating the vertical motion mechanism, female mold 3 and flanges 6 descend, so that tapered face 4a impinges against tapered face 10b. (See FIG. 4, start of the holding process.)

3. The split parts compress spring 12.

Spring 12 contracts earlier than expanding and contracting means 5, whereby sliding holds 10c are guided by rod members 11 to make split parts 10 slide on face 3a of female mold 3 and shift to the inside of the cavity of female mold 3 when split parts 10 contract each of their split faces impinges against one another, so that the periphery of upper layer member 13 is held between slidable frame 4 and flanges 6. (See FIGS. 5 and 6, the holding process and the preforming process.)

4. When molten resin 15 is supplied between upper layer member 13 and male mold 2, on the one hand, female mold 3 and flanges 6 both descend. Then expanding the contracting means 5 contracts and slidable frame 4 slides on other side face 9 of male mold 2 and descends.

At this time, molten resin 15 is supplied by a well-known melt-plasticizing means such as an extruder (not shown) through a molten resin passage (not shown) provided in the interior of male mold 2.

Figure 7:
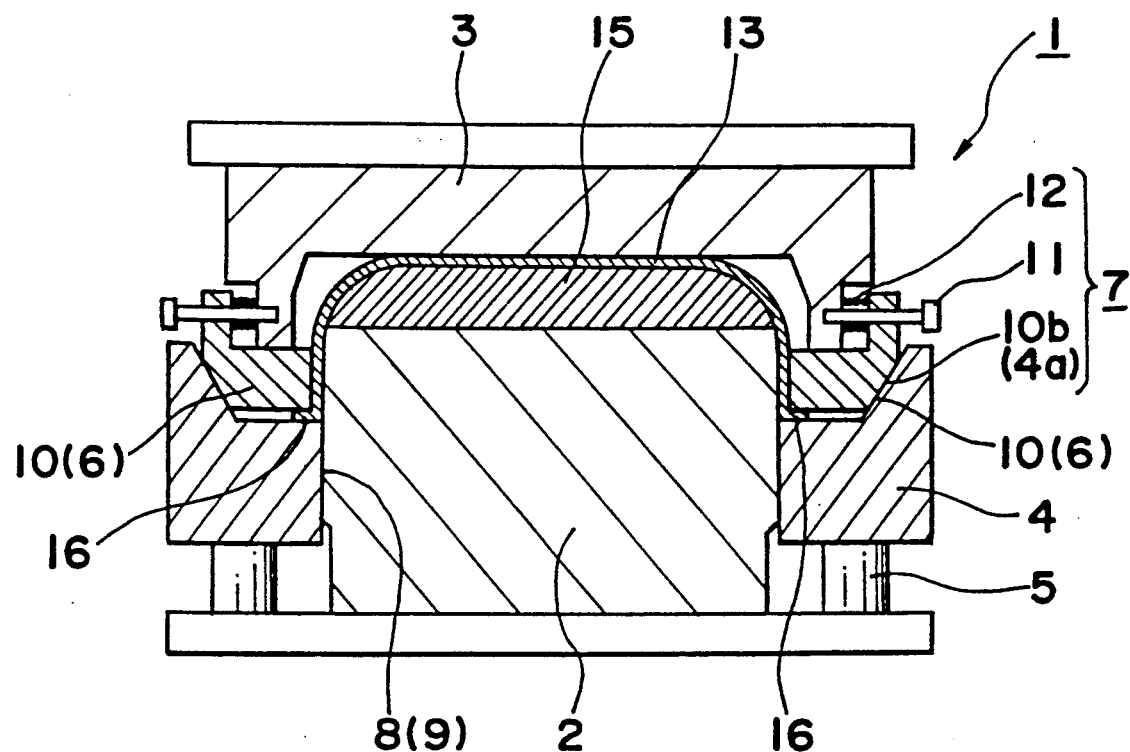

Simultaneous with the above steps, molten resin is forced to flow causing upper layer member 13 to be compressed against the side of female mold 3, in concert with the squeezing of molten resin 15 into the cavity of female mold 3, with a periphery of upper layer member 13 gliding between slidable frame 4 and flanges 6 and with upper layer member 13 extending (see FIG. 7, start of the forming and shaping process).

5. By further continuing the descend of female mold 3, both molds, male 2 and female 3, are tightened completely, and bent part 13a of upper layer member 13 and synthetic resin 17 are united in a body, thereby completing the molding operation. (See FIG. 8, the forming or shaping process.)

6. After synthetic resin 17 has hardened and when the mold-tightening force is no longer present, expanding and contracting means 5 is extended first, and followed by spring 12 being extended, as a result of which inner faces 10a of split parts 10 shift to the outside of the cavity of female mold 3, and thereby allowing finished laminated body 18 to be removed. (See FIG. 9, final of the forming or shaping process.)

In the method according to the present invention, the time when molten resin 15 is to be supplied is not restricted to the above-described time.

It does not matter if molten resin 15 is supplied when both male mold 2 and female mold 3 has approached as far as the position where upper layer member 13 is squeezed into the intermediate stage after periphery 16 of upper layer member 13 has been held between slidable frame 4 and flanges 6 when directly after arranging upper layer member 13 on slidable frame 4.

The forms of flanges 6, shifting mechanism 7 and others, are not always limited to the ones shown in FIGS. 1-9, since these can be in forms as shown in the figures for the other embodiments.

It is preferred if at least the form of flanges 6 has a construction whereby it is able to contract slidingly to the inside of the cavity of female mold 3 at the time when upper layer member 13 is held between or prior to this time, and to expand slidingly to the outside of the cavity of female mold 3 after the forming or shaping.

In the construction as shown in the exemplary embodiment, shifting mechanism 7 does not need any driving means and is easily controlled.

In the method according to the present invention, it will suffice if molten resin 15 is supplied between upper layer member 13 and male mold 2 through at least any one of the molten synthetic resin passages provided at the inside of male mold 2 or at the outside of molding apparatus 1.

Figure 8:
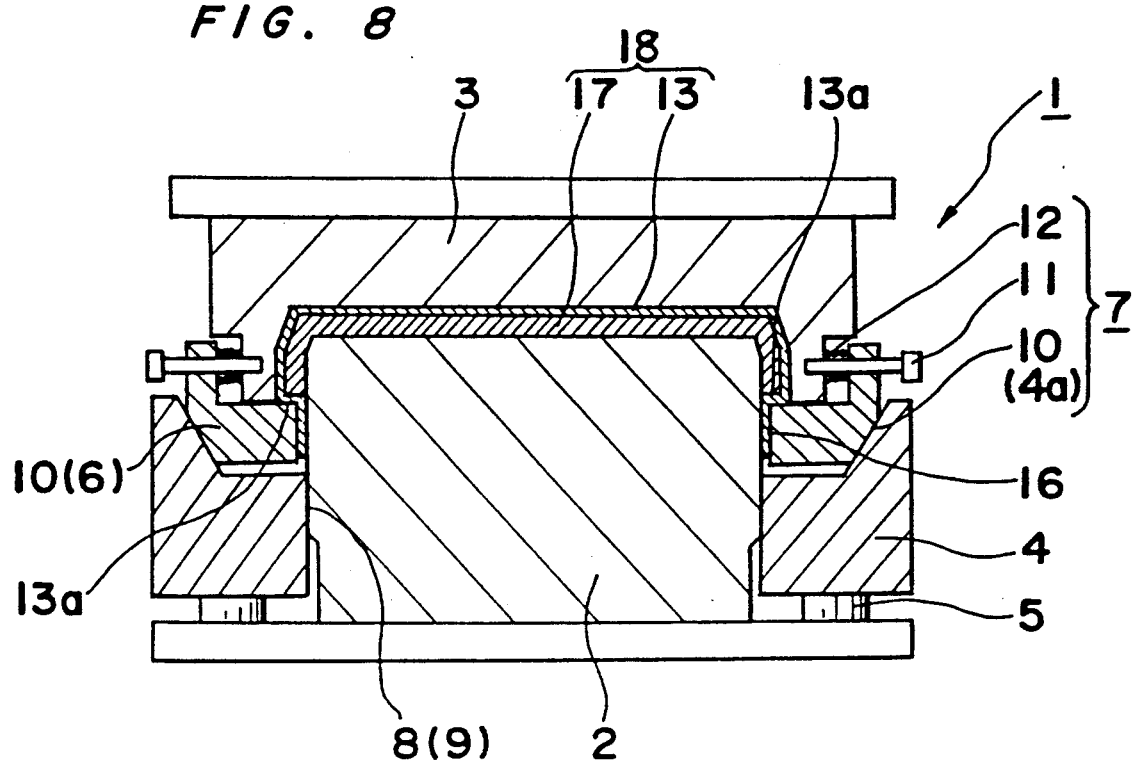
Figure 9:
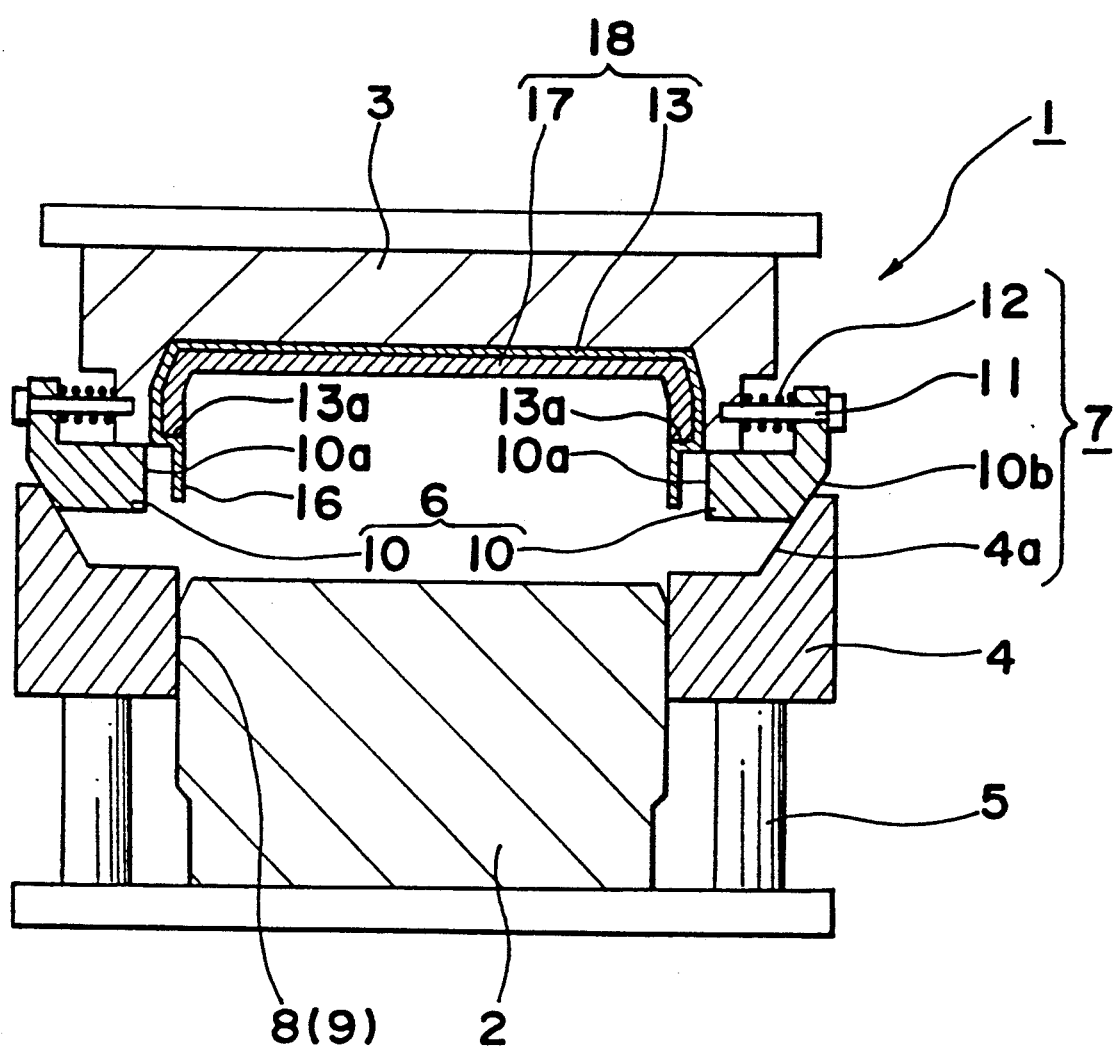
Figure 10:
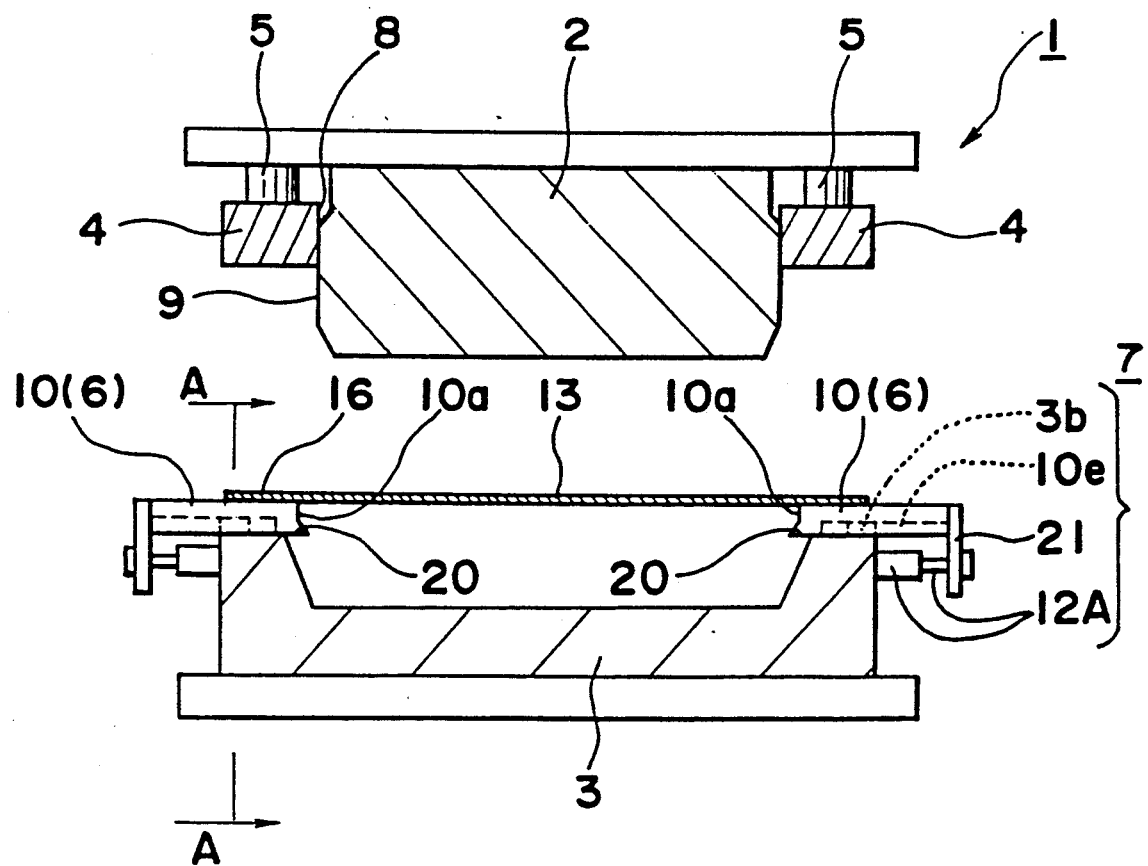
Figure 11:
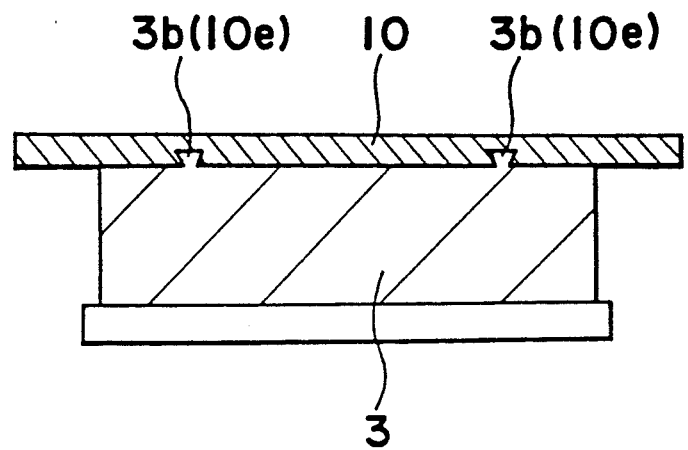
Figure 12:
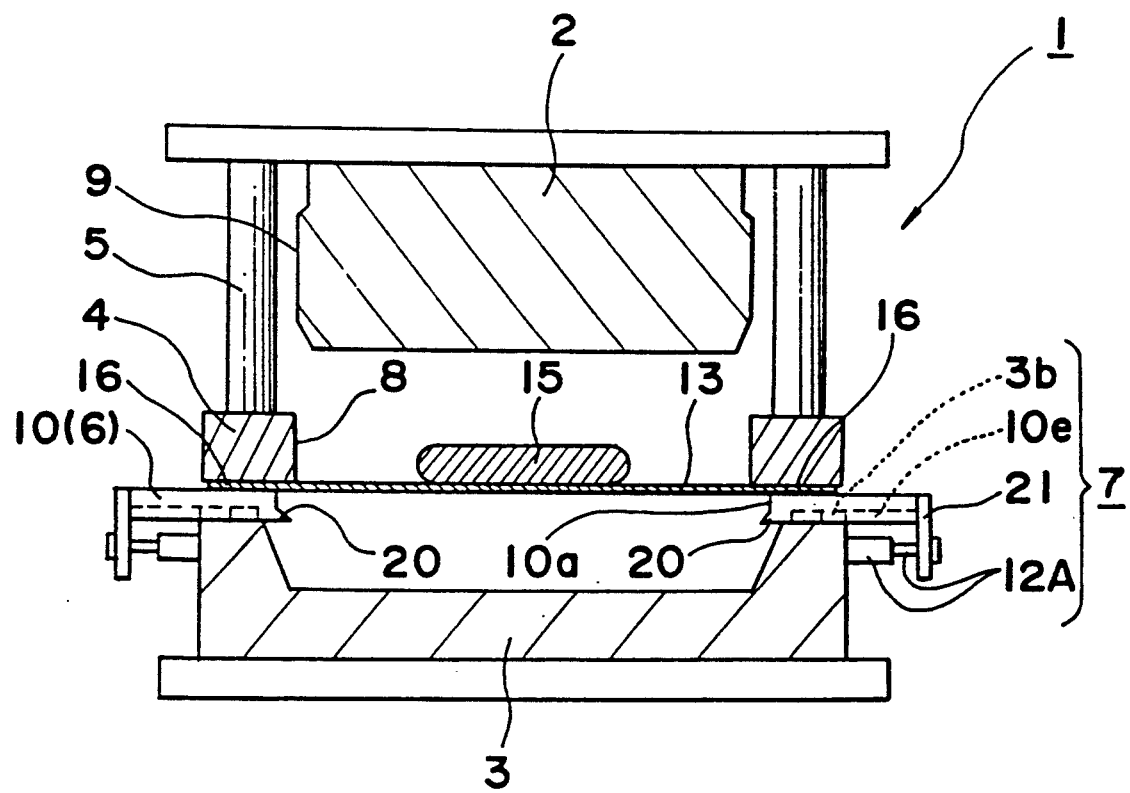
Figure 13:
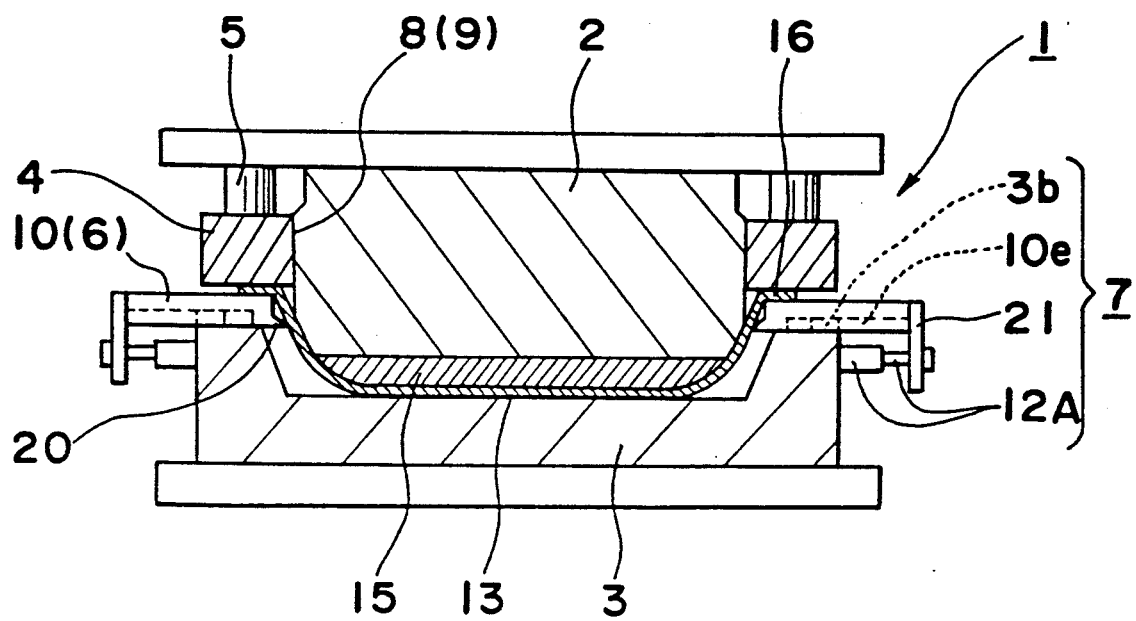
Figure 14:
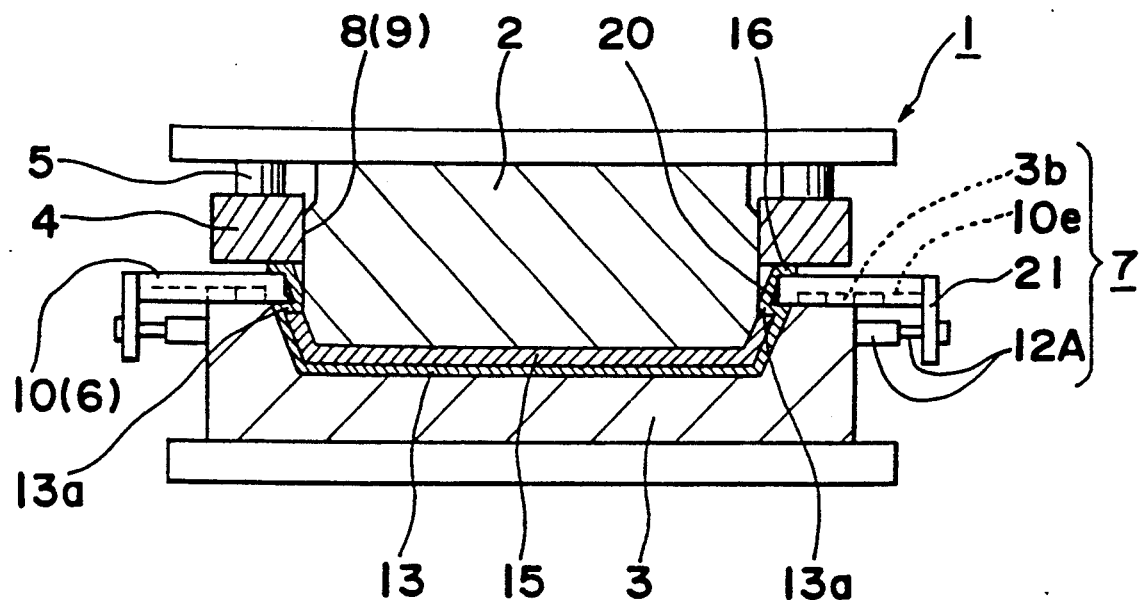
Figure 15:
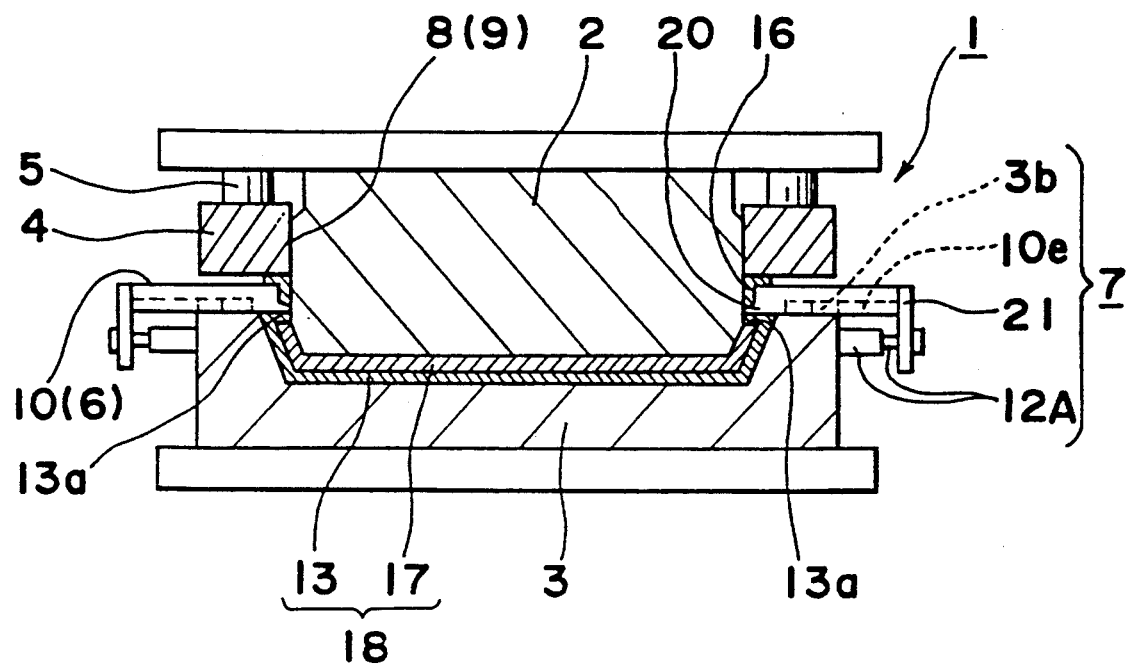
Figure 16:
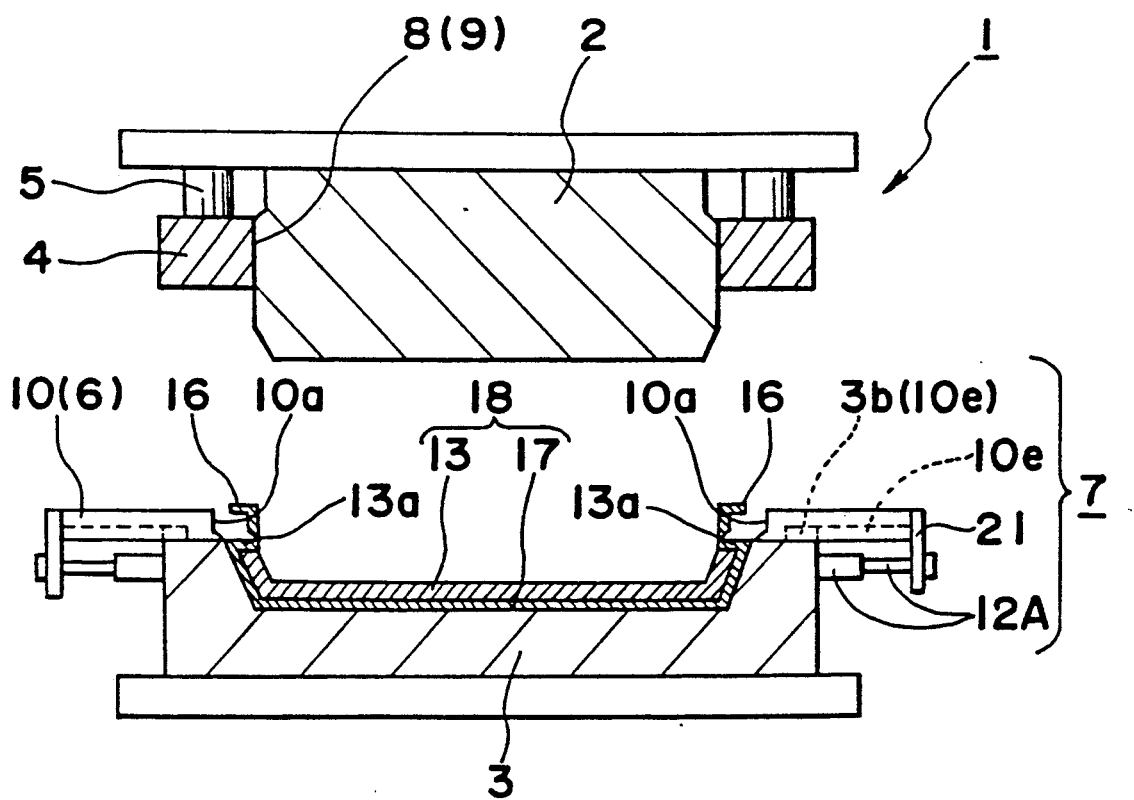

In the method according to the present invention, periphery 16 of upper layer member 13 occasionally will shift gradually toward the inside of female mold 3 as the molding progresses, as shown in FIG. 7 to 8, so that it is especially important to set the fixing force against upper layer member 13, because upper layer member 13 is likely to become deformed along the form female mold 3 as the latter descends.

With this in mind, when the holding force working between slidable frame 4 and flanges 6 and between flanges 6 and male mold 2 is too small, upper layer member 13 is caused to excessively guide between slidable frame 4 and flanges 6, and between flanges 6 and male mold 2, and thereby in turn would cause upper layer member 13 to become broader than the area required for laminated body 18 when molten resin 15 is supplied into female mold 3, which in turn would cause wrinkles in laminated body 18.

On the other hand, when the holding force is too great, upper layer member 13 would become unable to bear the tensile force created, and would thereby end up breaking.

In the method according to the present invention, in case the form of laminated body 18 is simple and some very stretchable fiber is used for upper layer member 13 (there are various kinds of fibers such as one having a stretchability of 400%), the gliding behavior as described in the exemplary embodiment for upper layer member 13, does not necessarily occur.

In order to set the above-mentioned holding force at the time of conducting the method according to the present invention, it is necessary to select the optimum value based on the properties of the materials to be used and the respective forms or shapes of the molded products to be obtained, that is, the stretchiness or the squeezing rate of upper layer member 13, the curvature of every vertex and edges of the molded goods to be obtained, etc.

However, the value generally used is about 5-300 $kg/cm^2$ to the cross sectional area of the fixing part.

In arranging the required area of upper layer member 13, it is necessary to design upper layer member 13 so as to limit the occurrence of trimming losses as much as possible. This should be accomplished, first on the basis of the developing area of laminated body 18 and next by reducing the size of upper layer member 13, while taking into consideration the stretchiness thereof.

For upper layer member 13 to be used in the method according to the present invention, there can be named the following materials: woven stuffs, unwoven stuffs, metal, fiber, thermoplastic resinous net, paper, metal foil, and sheet or film made of thermoplastic resin and thermoplastic elastomer. It does not matter if the materials used are decorated with concavoconvex patterns of tie-dyed fabrics, by printing or dyeing, or if foaming bodies are used. Further, it is also possible to use the above-mentioned materials which are in the form of a laminated article which has been made by laminating a single or two or more types of materials using adhesive agents and the like.

In using an upper layer member 13, it will suffice also to pre-heat it in order to regulate the stress or the stretchiness thereof prior to the supplying of molten resin 15.

For synthetic resin 17 used in the method according to the present invention, it is possible to use all materials ordinarily used in compression molding, injection molding, and extrusion molding, and, for example, nonfoamable or foamable resins made of thermoplastic elastomers such as ethylene-propylene block copolymer, styrene-butadiene block copolymer, thermoplastic resin such as nylon, polypropylene, polyethylene, polystylene, acrylonitrile-styrene-butadiene, and the like further the materials mentioned above can contain fillers such as, inorganic filler, glass fiber, etc., and such additives as pigments, talcs, antistatic agents, and the like.

Minor modifications to the first embodiment will be described hereinafter.

It is possible to move male mold 2 upwards by the vertical motion mechanism instead of moving female mold 3 downwards in FIG. 1.

In this case of minor modification, first, upper layer member 13 is arranged on male mold 2 and slidable frame 4, then slidable frame 4 is moved upwards to flanges 6, while periphery 16 of upper layer member 13 is held between flanges 6 and slidable frame 4.

After these steps, male mold 2 is moved upwards to female mold 3.

With exception of the moving of male mold 2, all other steps are the same as for the first embodiment.

Figure 23:
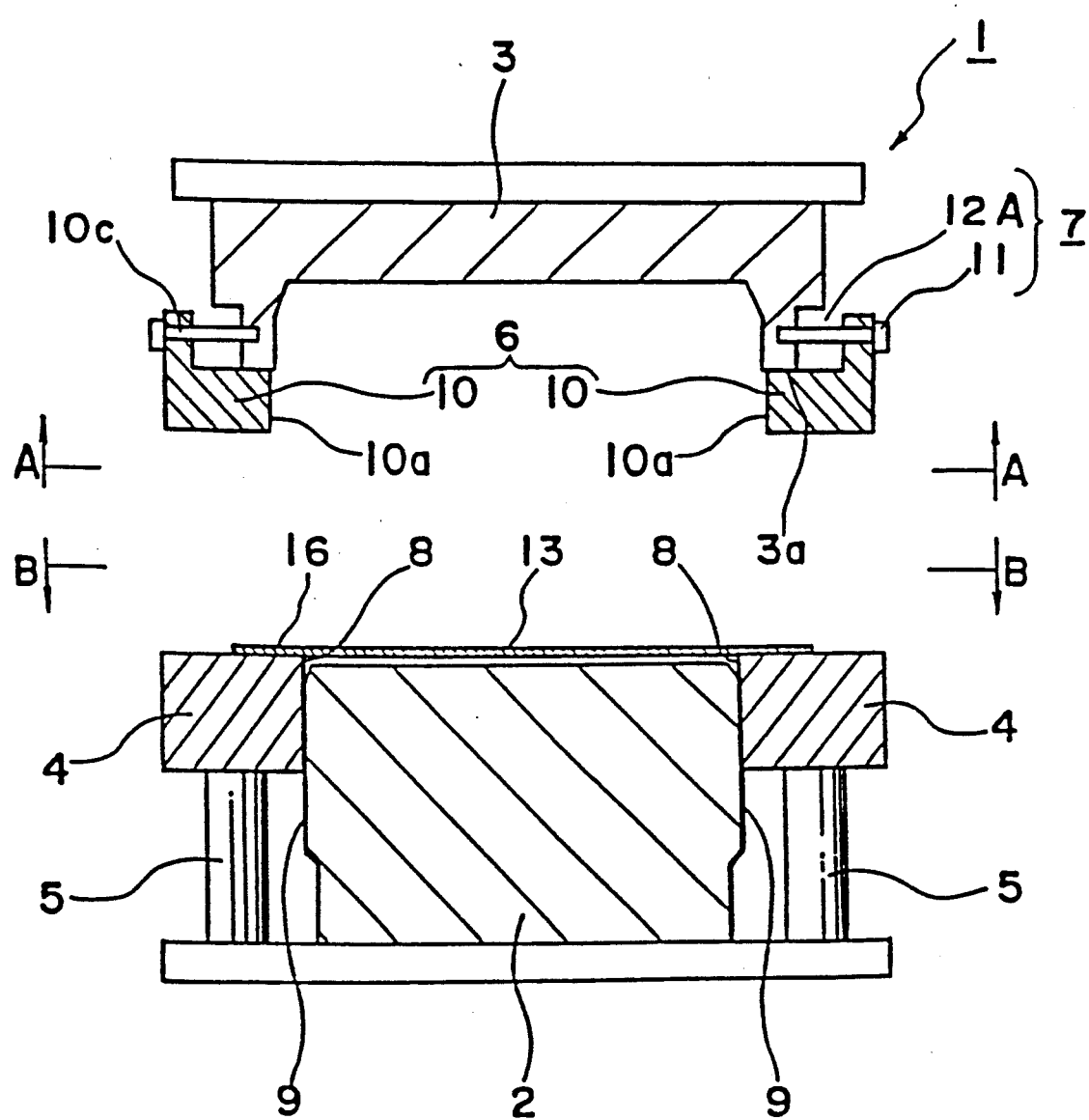
FIG. 23 is a cross-sectional view of the modified embodiment of FIG. 1.

FIG. 23 is another modified of the first embodiment.

In this case, both slidable frame 4 and flanges 6 have no tapered faces 4a and 10b.

Therefore, flanges 6 has expanding and contracting mechanisms 12A instead of spring 12.

Also, another modified embodiment allows male mold 2 or female mold 3 to be moved as in the first embodiment and the mirror modified first embodiment.

Finally, the first embodiment has 3 modifications.

In the modified embodiments hereinafter described, although the relative position between male mold 2 and female mold 3 and slidable frame 4 are subject to change, they have basically the same construction and effect as mentioned in the above description with respect to the exemplary embodiment.

FIGS. 10 to 16 are cross sectional views for explaining an invention, wherein slidable frame 4 is provided shiftably at male mold 2 which is situated above, while on the other hand flanges 6 is provided at female mold 3 which is situated below.

Flanges 6 consists of a plurality of split parts 10. Split parts 10 each has a plurality of dovetail grooves 10e and cutting edges 20 extending over the whole circumference of inner faces 10a.

Shifting mechanism 7 comprises dovetails 3b provided to protrude from female mold 3, dovetail grooves 10e sliding on above details 3b, driving-expanding and contracting means 12A attached to female mold 3, and plates 21.

The method according to the present invention is conducted by molding apparatus 1 of this modified embodiment by following the sequence of steps 1 to 6 described below:

1. Upper layer member 13 is arranged on flanges 6. (See FIG. 10.)

At this time, flanges 6 has already contracted leaving slight gaps between respective split parts 10. That is, inner faces 10a of split parts 10 are situated inside the cavity of female mold 3.

2. Next, after holding upper layer member 13 between slidable frame 4 and flanges 6 by expanding and contracting means 5 (for expanding and contracting means 5 in this case, it is possible to utilize a pressure cylinder or an oil pressure cylinder). Molten resin 15 is supplied between upper layer member 13 and male mold 2 from outside molding apparatus 1. (See FIG. 12.)

3. When the vertical motion mechanism is actuated without delay, then male mold 2 descends as expanding and contracting means 5 contracts, while molten resin 15 flows to compress upper layer member 13 downwards and to the side of female mold 3, in concert with which upper layer member 13 is squeezed while gliding and stretching between slidable frame 4 and flanges 6 into the concave part produced at the side of female mold 3. (See FIG. 13.)

4. As male mold 2 moves further downward, upper layer member 13 and molten resin 15 unite in a body to be formed or shaped as in the exemplary embodiment. (See FIG. 14.)

5. After synthetic resin 17 has hardened, the approaching force is reduced slightly, split parts 10 are shifted and compressed further to the inside of the cavity of female mold 3 by driving-expanding and contracting mans 12A. When split parts 10 has completely contracted, upper layer member 13 is cut off by cutting edges 20. (See FIG. 15.)

6. When the approaching force is removed, female mold 3 shifts upward. Next, when driving-expanding and contracting means 12A extends, dovetail grooves 10e slide on dovetails 3b and thereby inner faces 10a of split parts 10 shift to the outside of the cavity of female mold 3, when laminated body 18 is removed (see FIG. 16.).

In this modified embodiment, driving-expanding and contracting means 12A is used for shifting mechanism 7 and not springs, and accordingly, molding apparatus 1 does not require as much precise tolerance.

This shifting mechanism 7 is further furnished with cutting edges, and accordingly, the cutting of the upper layer member can be conducted on the same apparatus.

Minor modifications to the second embodiment will be described hereinafter.

It is possible to move female mold 3 upwards instead of moving male mold 2 downwards in FIGS. 10 to 16.

In this case of minor modification, first upper layer member 13 is arranged on female mold 3 and flanges 6, then slidable frame 4 is moved down to flanges 6, while periphery 16 of upper layer member 13 is held between flanges 6 and slidable frame 4.

After these steps, female mold 3 is moved upwards to male mold 2, while contracting slidable frame 4.

With exception of the moving of male mold 2, all other steps are the same as for the second embodiment.

Figure 24:
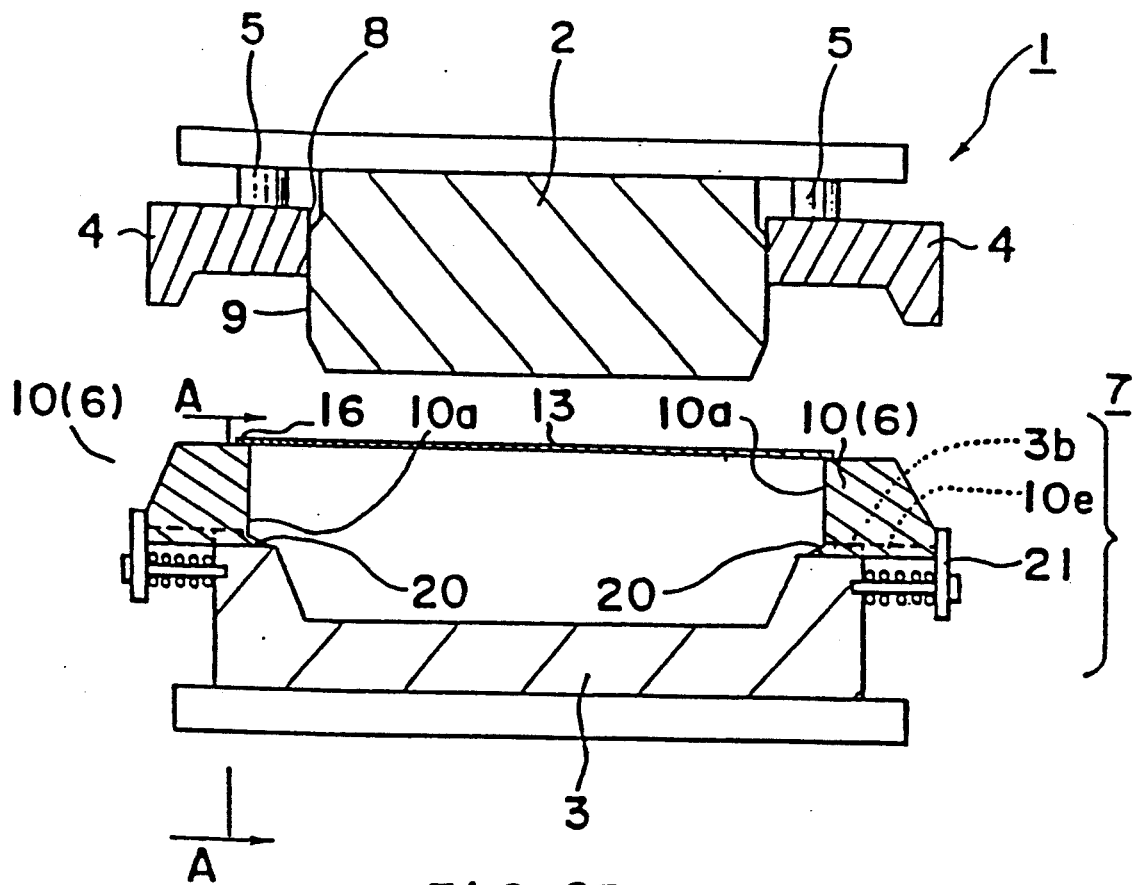
FIG. 24 is a cross-sectional view of the modified embodiment of FIG. 10.

FIG. 24 is another modified of the second embodiment.

In this case, both slidable frame 4 and flanges 6 have tapered faces 4a and 10b.

Therefore, flanges 6 has spring 12 instead of expanding and contracting mechanism 12A.

Tapered faces 4a and 10b and spring 12 consist of shifting mechanism 7.

Also, another modified embodiment allows male mold 2 or female mold 3 to be moved as in the second embodiment and the minor modified second embodiment.

Finally, the second embodiment has also 3 modifications.

Figure 17:
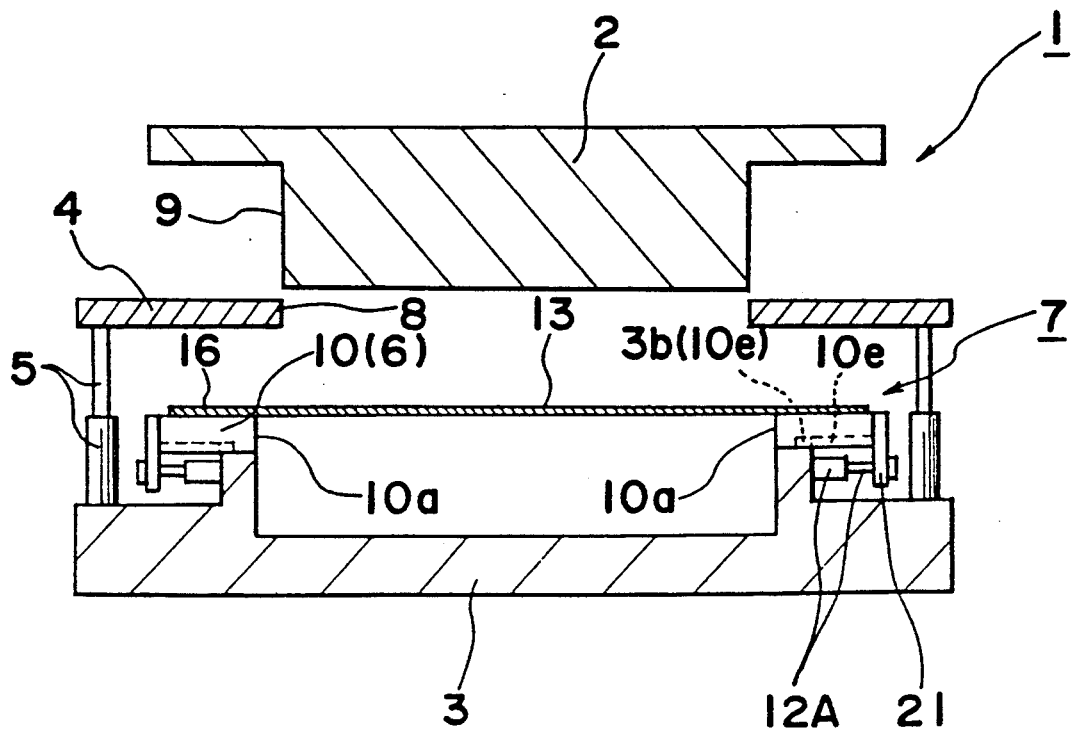
Figure 19:
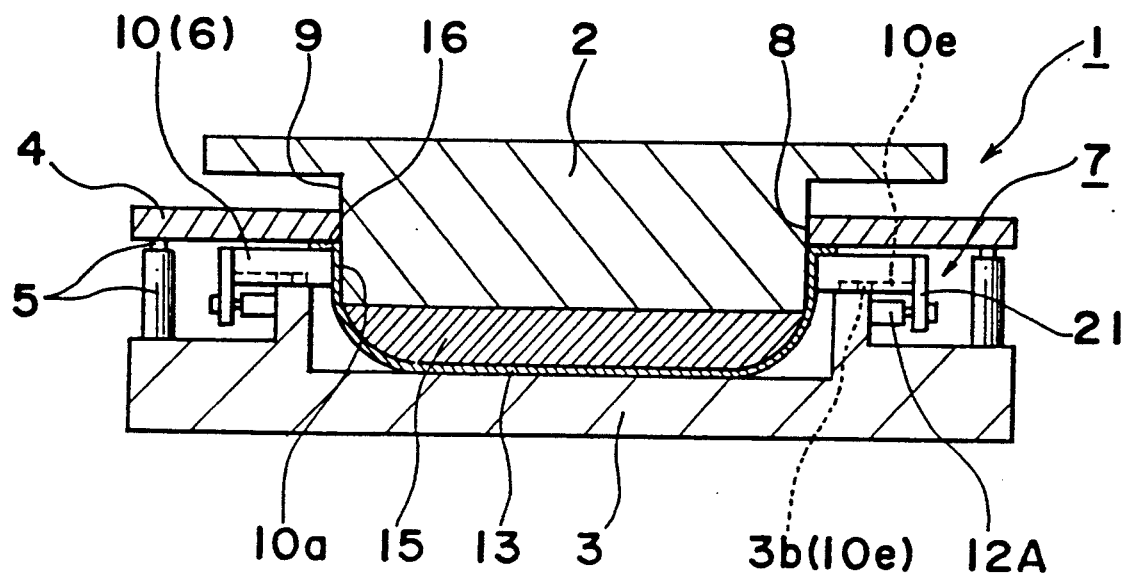

FIGS. 17 and 19 are cross-sectional views of another modified embodiment of the method according to the present invention.

Slidable frame 4 and flanges 6 are shiftably attached to the side of female mold 3, which is situated below, while male mold 2 is situated above.

In conducting the method according to the present invention on the basis of molding apparatus 1, upper layer member 13 is arranged on flanges 6, as shown in FIG. 17, and periphery 16 of upper layer member 13 is held between slidable frame 4 and flanges 6. When male mold 2 is moved downwards, as shown in FIG. 18, molten resin 15 is then supplied to form or shape upper layer member 13 and thereby produce the molding of the laminated body 18, as shown in FIG. 19.

Minor modifications to the third embodiment will be described hereinafter.

Figure 18:
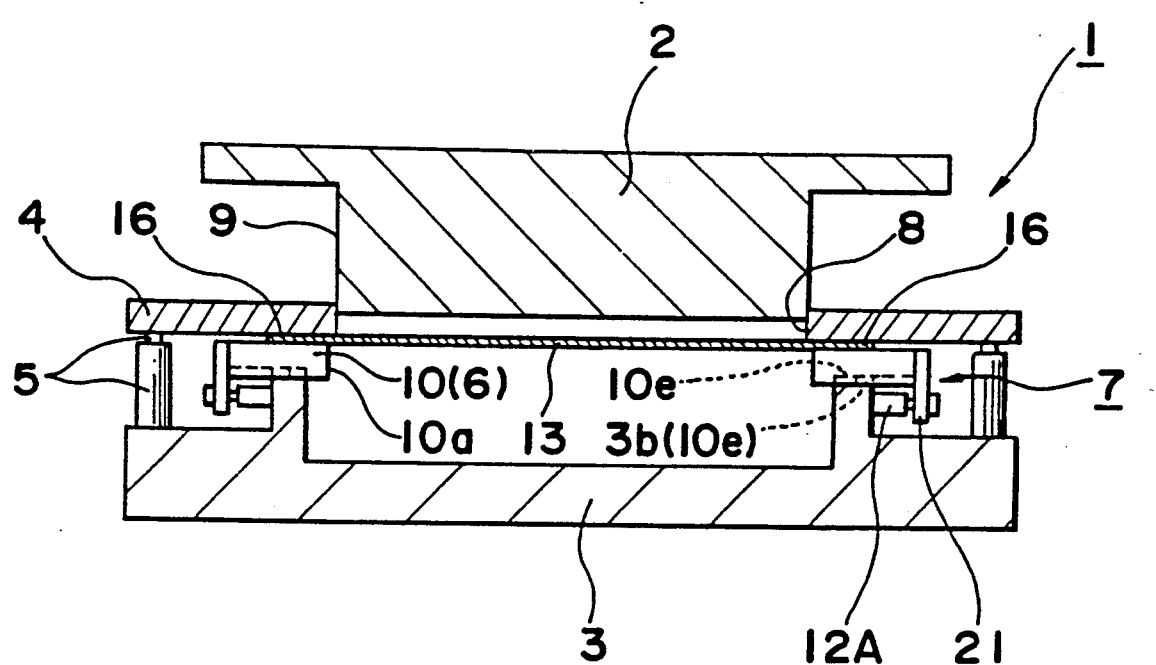

It is possible to move female mold 3 upwards instead of moving male mold 2 downwards in FIGS. 17 to 19.

In this case of minor modification, first upper layer member 13 is arranged on female mold 3 and flanges 6, then slidable frame 4 is moved downwards to flanges 6, while periphery 16 of upper layer member 13 is held between flanges 6 and slidable frame 4.

After these steps, female mold 3 is moved upwards to male mold 2, while contracting slidable frame 4.

With exception of the moving of female mold 2, all other steps are the same as for the third embodiment.

Figure 25:
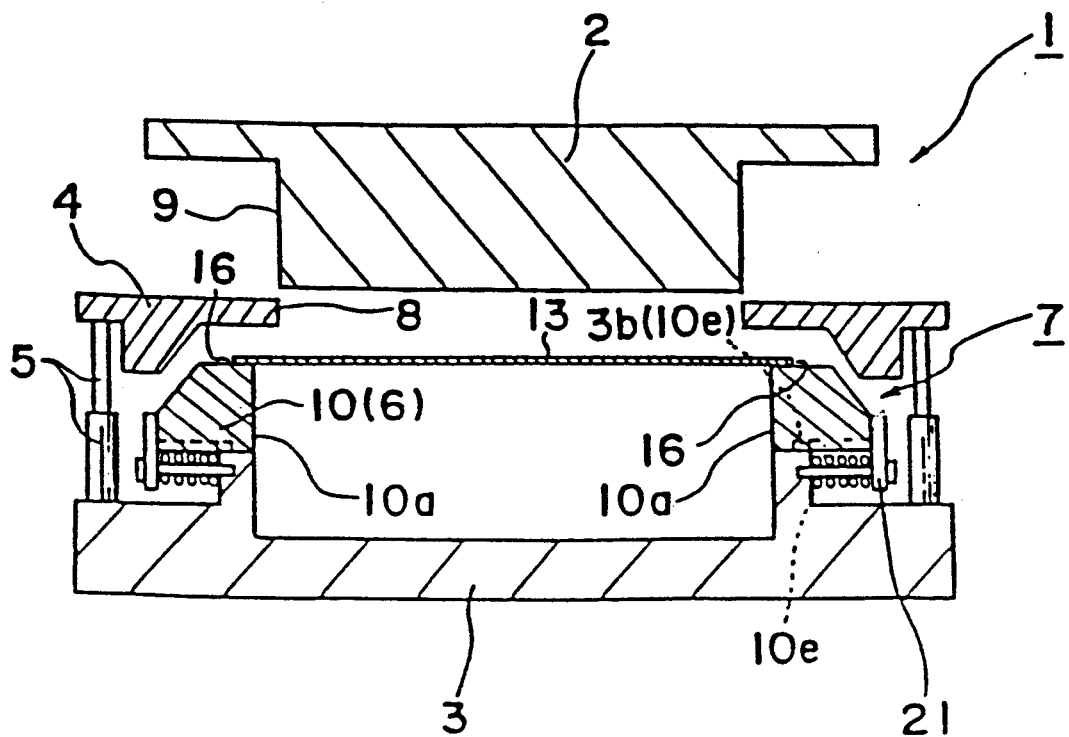
FIG. 25 is a cross-sectional view of the modified embodiment of FIG. 17.

FIG. 25 is another modified of the third embodiment.

In this case, both slidable frame 4 and flanges 4 have tapered faces 4a and 10b.

Therefore, flanges 6 has spring 12 instead of expanding and contracting mechanism 12A.

Tapered faces 4a and 10b and spring 12 consist of shifting mechanism 7.

Also, another modified embodiment allows male mold 2 or female mold 3 to be moved as in the third embodiment and the minor modified third embodiment.

Finally, the third embodiment has also 3 modifications.

Figure 20:
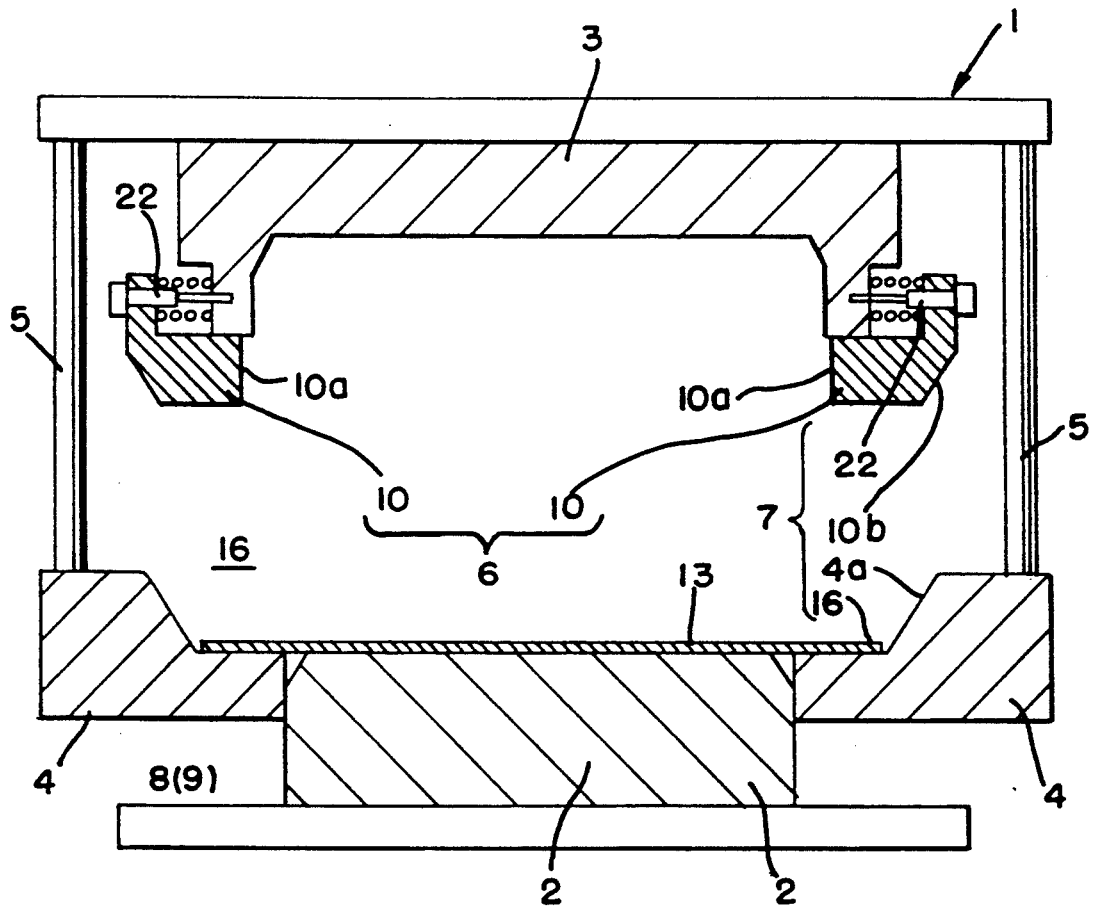
FIG. 20 is a cross-sectional view illustrating another modified embodiment of the present invention.

FIG. 20 is a cross-sectional view of yet another modified embodiment of the method according to the present invention, wherein periphery 16 of upper layer member 13 is held between flanges 6 attached to female mold 3 which is situated above and slidable frame 4 shiftably attached to the side of female mold 3. (The reference numeral 22 indicates an air pressure spring means.)

In carrying out the method according to the present invention by the use of molding apparatus 1 in this modified embodiment, upper layer member 13 is arranged on slidable frame 4, as shown in FIG. 20, female mold 3 is moved downwards to hold upper layer member 13, molten resin 15 is then supplied between slidable frame 4 and male mold 2 from the molten resin passages (not shown) to form or shape upper layer member 13 and the molding of the laminated body is further effected by tightening.

Minor modification to the fourth embodiment will be described hereinafter.

Figure 21:
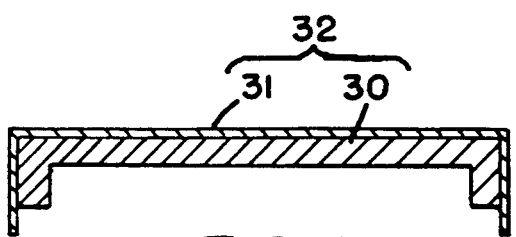
FIGS. 21 and 22 are cross-sectional views of the laminated bodies produced according to methods of the prior art.
Figure 22:
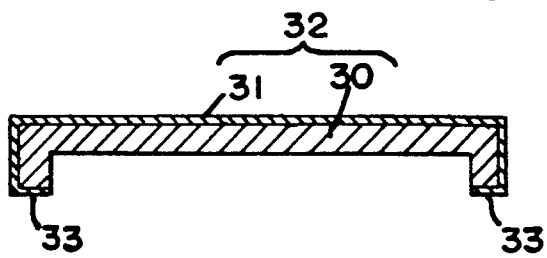

It is possible to move male mold 2 upwards instead of moving female mold 3 downwards in FIGS. 20 to 22.

In this case of minor modification, first upper layer member 13 is arranged on male mold 2 and slidable frame 4, then slidable frame 4 is moved upwards to flanges 6, while periphery 16 of upper layer member 13 is held between flanges 6 and slidable frame 4.

After these steps, male mold 2 is moved upwards to female mole 2, while contracting slidable frame 4.

With exception of the moving of male mold 2, all other steps are the same as for the fourth embodiment.

Figure 26:
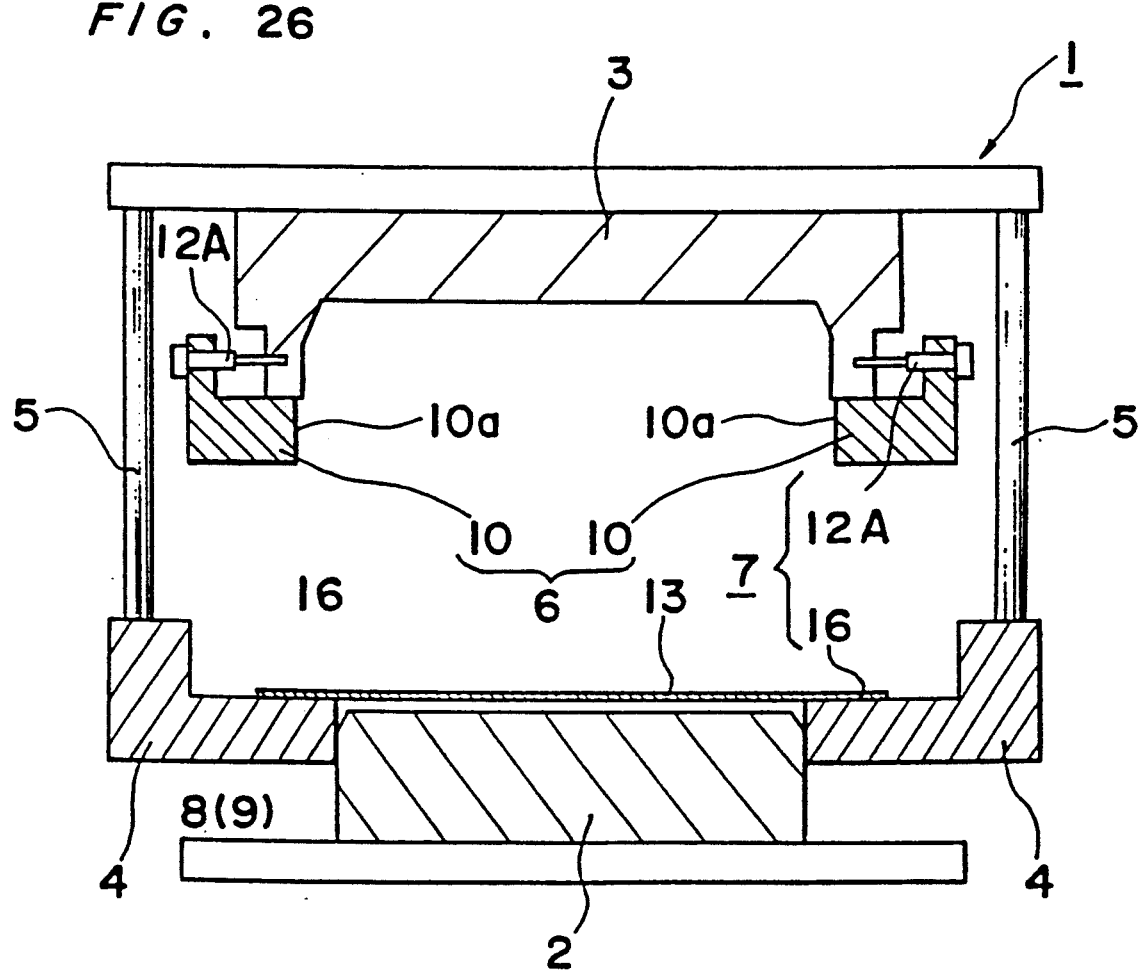
FIG. 26 is a cross-sectional view of the modified embodiment of FIG. 20.
Figure 27A:
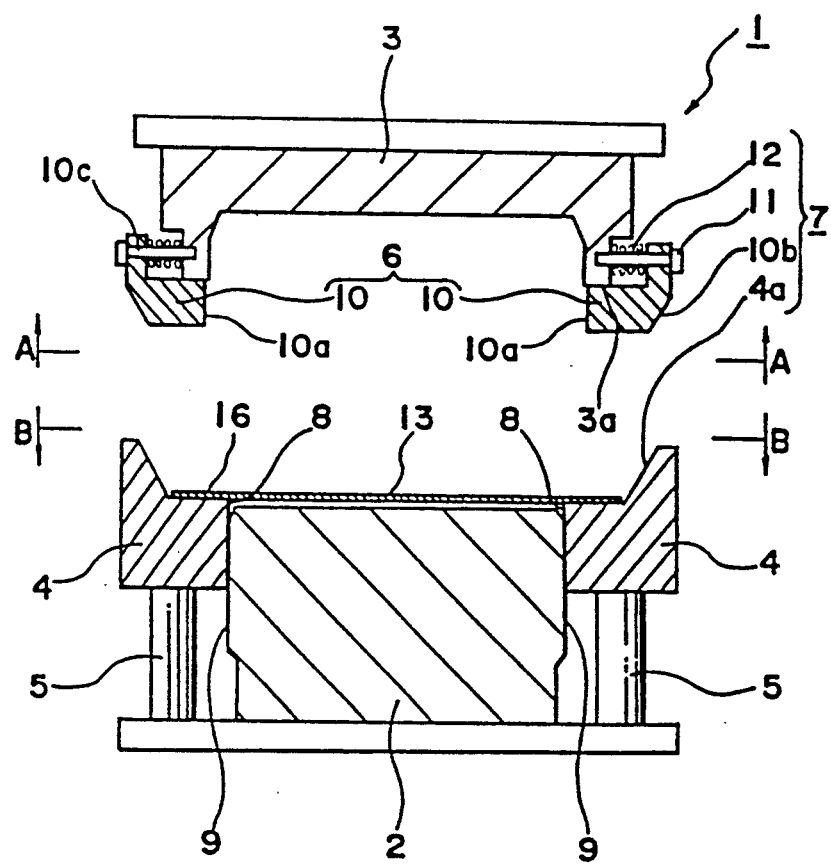
FIG. 27 (A) to (E) are cross-sectional views of the respective processes i.e., the arranging process (A), the holding process (B), the preforming process (C), the supplying process (D), and the forming or shaping process (E).
Figure 27B:
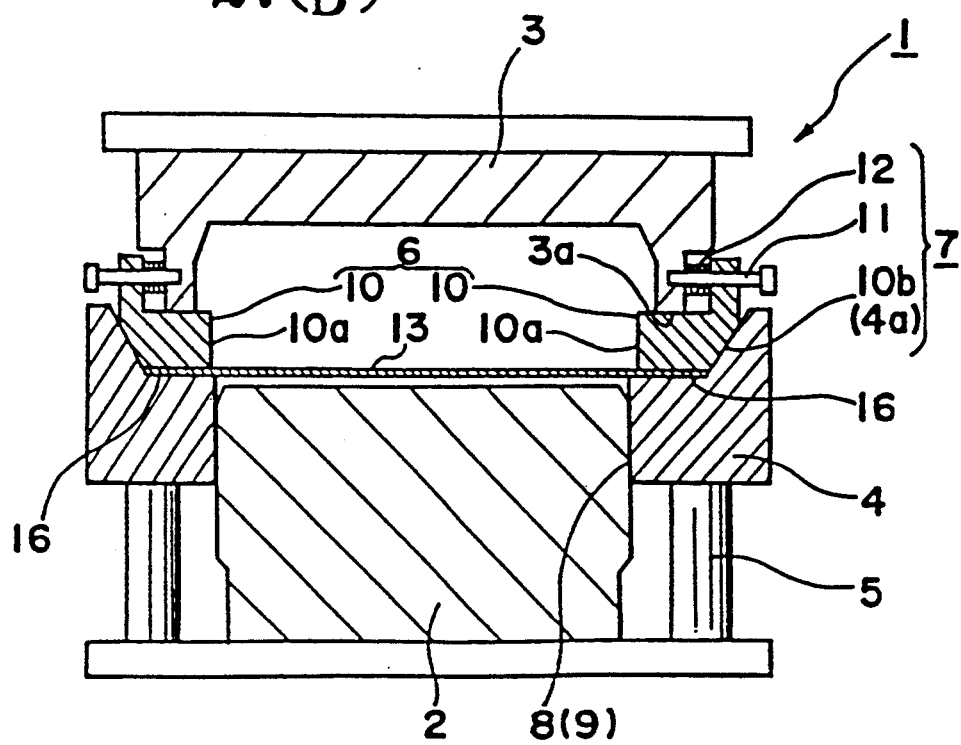
Figure 27D:
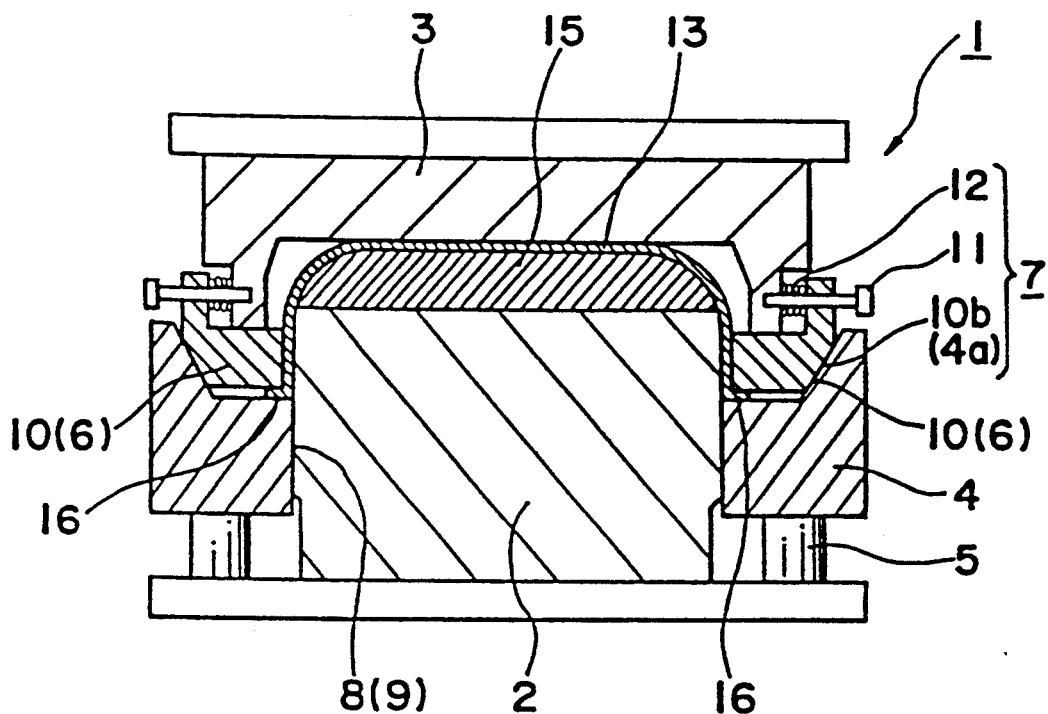
Figure 27E:
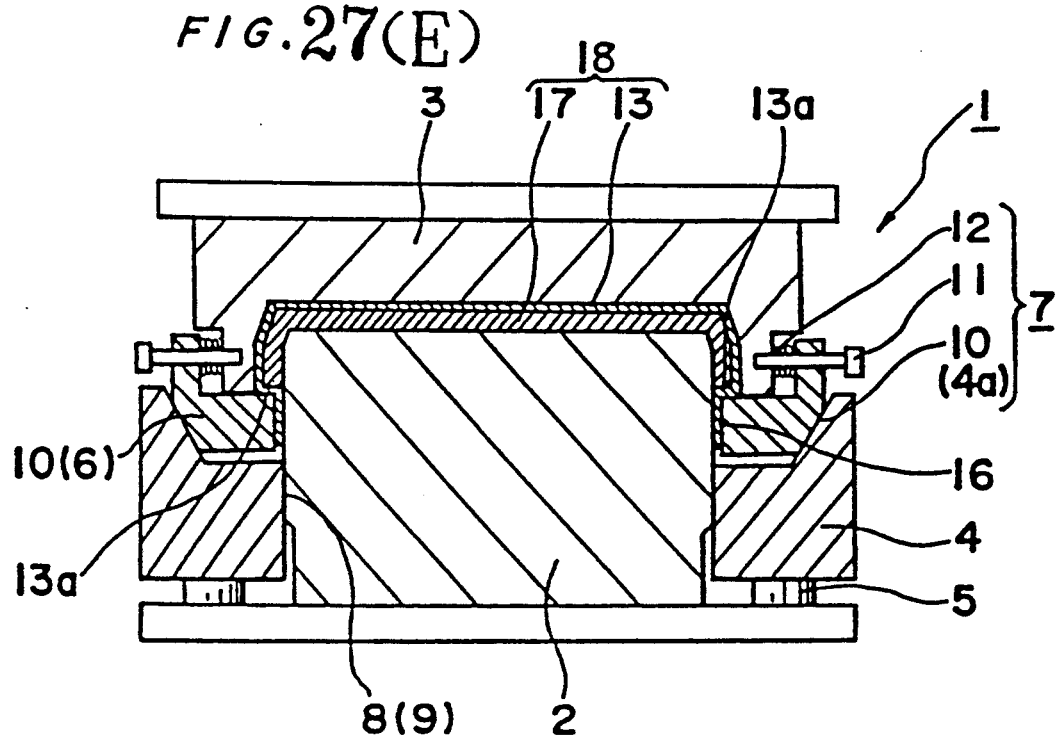

FIG. 26 is another modified of the fourth embodiment.

In this case, both slidable frame 4 and flanges 6 have tapered faces 4a and 10b.

Therefore, flanges 6 has expanding and contracting mechanism 12A instead of spring 12.

Also, another modified embodiment allows male mold 2 or female mold 3 to be moved as in the fourth embodiment and the minor modified fourth embodiment.

Finally, the fourth embodiment has also 3 modifications.

In the method according to the present invention, the separating direction namely means the approaching direction but is not always only the previously described vertical direction, since it does not matter if it is the horizontal direction.

In the latter case, molten resin 15 should flow out of molding apparatus 1, and the supplying of molten resin 15 is performed either after final approaching to some extent or before final approaching while making use of a receiver which had been built in advance within the apparatus.

As explained in detail above, the method according to the present invention is designed in such a manner that the upper layer member is arranged between the slidable frame which is shiftably attached to the male mold side at the female mold side of the molding apparatus having the male mold and the female mold and which is provided with the sliding face where the outer side of the male mold slides over the whole circumference, and the flanges which is attached to the female mold side slides on the face of the female mold opposite to the slidable frame, such that after holding the periphery of the upper layer member between the slidable frame and the flanges, the female mold and the male mold are approached together so as to form or shape the upper layer member. After the upper layer member has been arranged and preformed, the molten resin is supplied between the upper layer member and the male mold from the molten resin passages before the final forming or shaping to complete the molding of the molten resin.

With such a construction, the method according to the present invention has various advantages in that it does not require any additives, but also it can easily be adapted to mass production. It is capable of producing a laminated body having a good appearance without having wrinkles or tears on the upper layer member and without having wrinkles on the bent parts of the upper layer member. As a result, there can be obtained a laminated body which is free of residual stress due to the orientation because of the molding of its synthetic resin component not being dependent on an injection molding method and further the laminated body obtained has only a small degree of deformation such as distortion.

Further, the preferable feeling or touch of the laminated body produced in accordance with the method of the present invention can be maintained for a long period of time because the effective pressure required for molding the synthetic resin is small. For example, the method for producing the laminated body is capable of preventing a foaming layer from being crushed in the case of using a foaming sheet for the upper layer member. The method is also capable of preventing the napped part of a cloth from falling in the case of using a cloth treated by the nap-raising.

It will be evident from the invention being thus described, that it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a laminated body consisting of a thermoplastic resin provided with a layer member thereon by press molding, comprising the following continuous steps of:

arranging said layer member on a slidable frame attached to the sides of a male mold and providing a female mold having flanges mounted thereon;

holding a periphery of said layer member by closing said female mold and said flanges against said slidable frame and said male mold and shifting said flanges to the inside of the cavity of said female mold at least at the time of said closing;

preforming said layer member by approaching the molds toward each other after closing;

supplying, at any time from said holding and prior to the forming or shaping, molten resin between said layer member and said male mold;

forming or shaping said layer member and said molten resin to cover the face of a resin body being formed or shaped from said molten resin with said layer member and to form a bend of said layer member for lapping all end portions of the formed or shaped molten resin by approaching said female mold and said flanges against said male mold and slidable frame so as to form or shape said laminated body.

2. The method according to claim 1, wherein said slidable frame have tapered inner face and said flanges are tapered on the outside portions thereof, and at the time of closing said female mold and said flanges are impinged against said slidable frame, said tapered portions of said flanges slidably engage with said tapered inner face of said slidable frame.

3. The method according to claim 1, wherein said molten resin is supplied from outside of said male mold.

4. The method according to claim 1, wherein said molten resin is supplied via a passageway in said male mold.

5. A method of manufacturing a laminated body consisting of a thermoplastic resin provided with a layer member thereon by press molding, comprising the following continuous steps of:

arranging said layer member on a slidable frame attached to the sides of a male mold and provided a female mold having a flanges mounted thereon;

holding a periphery of said layer member by closing said male mold and said slidable frame against said female mold and flanges and shifting said flanges to the inside of the cavity of said female mold at least at the time of said closing;

preforming said layer member by approaching the molds toward each other after closing;

supplying, at any time from said holding and prior to the forming or shaping, molten resin between said layer member and said male mold;

forming or shaping said layer member and said molten resin to cover the face of a resin body being formed or shaped from said molten resin with said layer member and to form a bend of said layer member for lapping all end portions of the formed or shaped molten resin by approaching said male mold and slidable frame against said female mold and said flanges so as to form or shape said laminated body.

6. The method according to claim 5, wherein said slidable frame has tapered inner face and said flanges are tapered on the outside portions thereof, and at the time of closing said male mold and said slidable frame are impinged against said female mold and flanges, said tapered portions of said flanges slidably engage with said tapered inner face of said slidable frame.

7. The method according to claim 5, wherein said molten resin is supplied from outside of said male mold.

8. The method according to claim 5, wherein said molten resin is supplied via a passageway in said male mold.

9. A method of manufacturing a laminated body consisting of a thermoplastic resin provided with a layer member thereon by press molding, comprising the following continuous steps of:

arranging said layer member on flanges provided at the top portion of a female mold and providing a slidable frame attached to the sides of male mold;

holding a periphery of said layer member by closing said slidable frame and said male mold against said flanges and said female mold and shifting said flanges to the inside of the cavity of said female mold at least at the time of said closing;

preforming said layer member by approaching the molds toward each other after closing;

supplying, at any time from said holding and prior to the forming or shaping, molten resin between said layer member and said male mold;

forming or shaping said layer member and said molten resin to cover the face of a resin body being formed or shaped from said molten resin with said layer member and to form a bend of said layer member for lapping all end portions of the formed or shaped molten resin by approaching said male mold and said slidable frame against said female mold and said flanges so as to form or shape said laminated body.

10. The method according to claim 9, wherein said slidable frame has tapered inner face and said flanges are tapered on outside portions thereof, and at the time of closing said slidable frame are impinged against said female mold and flanges, said tapered portions of said flanges slidably engage with said tapered inner face of said slidable frame.

11. The method according to claim 9, wherein said molten resin is supplied via a passageway in said male mold.

12. The method according to claim 9, wherein said molten resin is supplied from outside said male mold.

13. A method of manufacturing a laminated body consisting of a thermoplastic resin provided with a layer member thereon by press molding, comprising the following continuous steps of:

arranging said layer member on flanges provided at the top portion of a female mold and providing a slidable frame attached to the sides of a male mold;

holding a periphery of said layer member by closing said female mold and said flanges against said slidable frame and said male mold and shifting said flanges to the inside of the cavity of said female mold at least at the time of said closing;

preforming said layer member by approaching the molds toward each other after closing;

supplying, at any time from said holding and prior to the forming or shaping, molten resin between said layer member and said male mold;

forming or shaping said layer member and said molten resin to cover the face of a resin body being formed or shaped from said molten resin with said layer member and to form a bend of said layer member for lapping all end portions of the formed or shaped molten resin by approaching said female mold and said flanges against said male mold and slidable frame so as to form or shape said laminated body.

14. The method according to claim 13, wherein said slidable frame has tapered inner face and said flanges are tapered on the outside portions thereof, and at the time of closing said female mold and said flanges are impinged against said male mold and said slidable frame, said tapered portion of said flanges slidably engage with said tapered inner face of said slidable frame.

15. The method according to claim 13, wherein said molten resin is supplied via a passageway in said male mold.

16. The method according to claim 13, wherein said molten resin is supplied from outside said male mold.

17. A method of manufacturing a laminated body consisting of a thermoplastic resin provided with a layer member thereon by press molding, comprising the following continuous steps of:
 arranging said layer member on a slidable frame attached to the sides of a female mold and providing female mold having flanges mounted thereon;
 holding a periphery of said layer member by closing said slidable frame against said female mold and said flanges and shifting said flanges to the inside of the cavity of said female mold at least at the time of said closing;
 preforming said layer member by approaching the molds toward each other after closing;
 supplying, at any time from said holding and prior to the forming or shaping, molten resin between said layer member and said male mold;
 forming or shaping said layer member and said molten resin to cover the face of a resin body being formed or shaped from said molten resin with said layer member and to form a bend of said layer member for lapping all end portions of the formed or shaped molten resin by approaching said female mold and said flanges against said male mold so as to form or shape said laminated body.

18. The method according to claim 17, wherein said slidable frame has tapered inner face and said flanges are tapered on the outside portions thereof, and at the time of closing said flanges are impinged against said female mold and said flanges, said tapered portions of said flanges slidably engage with said tapered inner face of said slidable frame.

19. The method according to claim 17, wherein said molten resin is supplied from outside of said male mold.

20. The method according to claim 17, wherein said molten resin is supplied via a passageway in said male mold.

21. A method of manufacturing a laminated body consisting of a thermoplastic resin provided with a layer member thereon by press molding, comprising the following continuous steps of:
 arranging said layer member on a slidable frame attached to the sides of a female mold and providing a female mold having flanges mounted thereon;
 holding a periphery of said layer member by closing said male mold against said female mold and said flanges and shifting said flanges to the inside of cavity of said female mold at least at the time of said closing;
 preforming said layer member by approaching the molds toward each other after closing;
 supplying, at any time from said holding and prior to the forming or shaping, molten resin between said layer member and said male mold;
 forming or shaping said layer member and said molten resin to cover the face of a resin body being formed or shaped from said molten resin with said layer member and to form a bend of said layer member for lapping all end portions of the formed or shaped molten resin by approaching said male mold against female mold and said flanges against female mold and said flanges so as to form or shape said laminated body.

22. The method according to claim 21, wherein said slidable frame have tapered inner face and said flanges are tapered on the outside portions thereof, and at the time of closing said slidable frame are impinged against said flanges and female mold siad tapered portions of said flanges slidably engage with said tapered inner face of said slidable frame.

23. The method according to claim 21, wherein said molten resin is supplied from outside of said male mold.

24. The method according to claim 21, wherein said molten resin is supplied via a passageway in said male mold.

25. A method of manufacturing a laminated body consisting of a thermoplastic resin provided with a layer member thereon by press molding, comprising the following continuous steps of:
 arranging said layer member on flanges attached to the top portion on the female mold and providing a slidable frame attached to the sides of female mold;
 holding a periphery of said layer member by closing said slidable frame against said flanges and shifting said flanges to the inside of the cavity of said female mold at the time of said closing;
 preforming said layer member by approaching the molds toward each other after closing;
 supplying, at any time from said holding and prior to the forming or shaping, molten resin between said layer member and said male mold;
 forming or shaping said layer member and said molten resin to cover the face of a resin body being formed or shaped from said molten resin with said layer member and to form a bend of said layer member for lapping all end portions of the formed or shaped molten resin approaching said male mold against said female mold and said flanges so as to form or shape said laminated body.

26. The method according to claim 25, wherein said slidable frame has tapered inner face and said flanges are tapered on the outside portions thereof, and at the time of closing said slidable frame are impinged, against said female mold and flanges, said tapered portions of said flanges slidably engage with said tapered inner face of said frame.

27. The method according to claim 25, wherein said molten resin is supplied via a passageway in said male mold.

28. The method according to claim 25, wherein said molten resin is supplied from outside said male mold.

29. A method of manufacturing a laminated body consisting of a thermoplastic resin provided with a layer member thereon by press molding, comprising the following continuous steps of:
 arranging said layer member on flanges provided at the top portion of a female mold and providing a slidable frame attached to the sides of female mold;
 holding a periphery of said layer member by closing said slidable frame against said flanges and shifting said flanges to the inside of cavity of said female mold at least at the time of said closing;

preforming said layer member by approaching the molds toward each other after closing;

supplying, at any time from said holding and prior to the forming or shaping, molten resin between said layer member and said male mold;

forming or shaping said layer member and said molten resin to cover the face of a resin body being formed or shaped from said molten resin with said layer member and to form a bend of said layer member for lapping all end portions of the formed or shaped molten resin by approaching said female mold and said flanges against said male mold so as to form or shape said laminated body.

30. The method according to claim 29, wherein said slidable frame has tapered inner face and said flanges are tapered on the outside portions thereof, and at the time of closing said male mold and said slidable frame are impinged against said female mold and flanges, said tapered portions of siad flanges slidably engage with said tapered inner face of said slidable frame.

31. The method according to claim 29, wherein said molten resin is supplied via a passageway in said male mold.

32. The method according to claim 29, wherein said molten resin is supplied from outside said male mold.

* * * * *